US009094330B2

(12) United States Patent
Takase et al.

(10) Patent No.: US 9,094,330 B2
(45) Date of Patent: Jul. 28, 2015

(54) DATA TRANSPORT SYSTEM AND CONTROL METHOD OF DATA TRANSPORT SYSTEM

(75) Inventors: Masayuki Takase, Fujisawa (JP); Masahiro Kimura, Fujisawa (JP); Kazuhiro Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 13/552,777

(22) Filed: Jul. 19, 2012

(65) Prior Publication Data

US 2013/0022052 A1 Jan. 24, 2013

(30) Foreign Application Priority Data

Jul. 21, 2011 (JP) ................................ 2011-159863

(51) Int. Cl.
*H04L 12/703* (2013.01)
*H04L 12/751* (2013.01)
*H04L 12/707* (2013.01)

(52) U.S. Cl.
CPC ................ *H04L 45/28* (2013.01); *H04L 45/02* (2013.01); *H04L 45/22* (2013.01)

(58) Field of Classification Search
USPC ................................................. 370/218, 219
See application file for complete search history.

(56) References Cited

U.S. PATENT DOCUMENTS 6,546,003 B1 * 4/2003 Farris ............................ 370/352
6,771,673 B1 * 8/2004 Baum et al. ................... 370/535
6,940,858 B1 * 9/2005 Hunlich ........................ 370/392
7,409,712 B1 * 8/2008 Brooks et al. .................. 726/22
2001/0019554 A1 * 9/2001 Nomura et al. ............... 370/389
2002/0067729 A1 * 6/2002 Fukuda et al. ........... 370/395.21

(Continued)

FOREIGN PATENT DOCUMENTS

JP 10-341236 A 12/1998
JP 2000-183919 A 6/2000

(Continued)

OTHER PUBLICATIONS

Japanese Office Action dated Jul. 29, 2014, with English translation, (Seven (7) pages).

*Primary Examiner* — Ian N Moore
*Assistant Examiner* — Eric P Smith
(74) *Attorney, Agent, or Firm* — Crowell & Moring LLP

(57) ABSTRACT

An example of a data transport system includes transport nodes of a transport network, communication devices which communicate via the transport network, and a transport network logical path management server for setting logical paths between the transport nodes within the transport network, and a logical path control server. In a case where a first communication device is newly connected with a first transport node, the first communication device transmits control data to a logical path control server via the first transport node. The logical path control server obtains information about a connection relation between the newly connected first communication device and the first transport node from the control data, and establishes a logical path between the first communication device and a second communication device based on the obtained information about the connection relation and on information about logical paths between transport nodes in a logical path database.

15 Claims, 23 Drawing Sheets

(56) References Cited

U.S. PATENT DOCUMENTS

| | | | | |
|---|---|---|---|---|
| 2003/0084367 | A1* | 5/2003 | Suemura | 714/4 |
| 2003/0091049 | A1* | 5/2003 | Abe et al. | 370/392 |
| 2005/0169270 | A1 | 8/2005 | Mutou et al. | |
| 2007/0053369 | A1 | 3/2007 | Mizutani et al. | |
| 2007/0171817 | A1 | 7/2007 | Fujita et al. | |
| 2011/0038253 | A1* | 2/2011 | Yabusaki et al. | 370/217 |
| 2011/0142053 | A1* | 6/2011 | Van Der Merwe et al. | 370/395.1 |

FOREIGN PATENT DOCUMENTS

| | | | |
|---|---|---|---|
| JP | 2003-273907 | A | 9/2003 |
| JP | 3910200 | B2 | 2/2007 |
| JP | 2007-201575 | A | 8/2007 |
| JP | 2008-54129 | A | 3/2008 |
| JP | 2009-200658 | A | 9/2009 |
| JP | 2010-246138 | A | 10/2010 |
| WO | WO 02/073879 | A2 | 9/2002 |

* cited by examiner

45

| NETWORK ADDRESS (61) | TRANSMISSION LSP (62) | RECEPTION LSP (63) | LSP STATE (64) |
|---|---|---|---|
| BB | 10 | 100 | NORMAL |
| CC | 20 | 200 | NORMAL |
| DD | 30 | 300 | NORMAL |
| | | | |

| PATH SOURCE TRANSPORT NODE ID (71) | PATH TERMINATE TRANSPORT NODE ID (72) | LSP (73) |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| | | |
| | | |

| TRANSPORT NODE ID (81) | ROUTER ID (82) | NETWORK ADDRESS (83) | STATE (84) |
|---|---|---|---|
| TRANSPORT NODE 20-1 | ROUTER 11-1 | AA | NORMAL |
| TRANSPORT NODE 20-2 | ROUTER 11-2 | BB | NORMAL |
| TRANSPORT NODE 20-3 | ROUTER 11-3 | CC | NORMAL |
| TRANSPORT NODE 20-4 | ROUTER 11-4 | DD | NORMAL |
| | | | |

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE
BEFORE ROUTER 11-2 IS CONNECTED

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| | | | |
| | | | |
| | | | |
| | | | |

NEIGHBOR IP ROUTER DATABASE
BEFORE ROUTER 11-2 IS CONNECTED

45

| NETWORK ADDRESS | TRANSMISSION LSP | RECEPTION LSP | LSP STATE |
|---|---|---|---|
| | 10 | 100 | NORMAL |
| | 20 | 200 | NORMAL |
| | 30 | 300 | NORMAL |
| | | | |

ROUTING INFORMATION TABLE OF
TRANSPORT NODE 20-1 BEFORE ROUTER 11-2 IS CONNECTED

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE AFTER ROUTER 11-2 IS CONNECTED

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| TRANSPORT NODE 20-2 | ROUTER 11-2 | BB | NORMAL |
| | | | |
| | | | |
| | | | |

NEIGHBOR IP ROUTER DATABASE AFTER ROUTER 11-2 IS CONNECTED

45

| NETWORK ADDRESS | TRANSMISSION LSP | RECEPTION LSP | LSP STATE |
|---|---|---|---|
| BB | 10 | 100 | NORMAL |
| | 20 | 200 | NORMAL |
| | 30 | 300 | NORMAL |
| | | | |

ROUTING INFORMATION TABLE OF TRANSPORT NODE 20-1 AFTER ROUTER 11-2 IS CONNECTED

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE
BEFORE FAILURE OCCURS IN TRANSPORT NETWORK

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| TRANSPORT NODE 20-2 | ROUTER 11-2 | BB | NORMAL |
| TRANSPORT NODE 20-3 | ROUTER 11-3 | CC | NORMAL |
| TRANSPORT NODE 20-4 | ROUTER 11-4 | DD | NORMAL |
| | | | |

NEIGHBOR IP ROUTER DATABASE
BEFORE FAILURE OCCURS IN TRANSPORT NETWORK

45

| NETWORK ADDRESS | TRANSMISSION LSP | RECEPTION LSP | LSP STATE |
|---|---|---|---|
| BB | 10 | 100 | NORMAL |
| CC | 20 | 200 | NORMAL |
| DD | 30 | 300 | NORMAL |
| | | | |

ROUTING INFORMATION TABLE OF TRANSPORT NODE 20-1
BEFORE FAILURE OCCURS IN TRANSPORT NETWORK

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE
AFTER FAILURE OCCURS IN TRANSPORT NETWORK

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| TRANSPORT NODE 20-2 | ROUTER 11-2 | BB | NORMAL |
| TRANSPORT NODE 20-3 | ROUTER 11-3 | CC | NORMAL |
| TRANSPORT NODE 20-4 | ROUTER 11-4 | DD | NORMAL |
| | | | |

NEIGHBOR IP ROUTER DATABASE
AFTER FAILURE OCCURS IN TRANSPORT NETWORK

45

91

| NETWORK ADDRESS | TRANSMISSION LSP | RECEPTION LSP | LSP STATE |
|---|---|---|---|
| BB | 10 | 100 | COMMUNICATION ALERT DETECTED |
| CC | 20 | 200 | NORMAL |
| DD | 30 | 300 | NORMAL |
| | | | |

ROUTING INFORMATION TABLE OF TRANSPORT NODE 20-1
AFTER FAILURE OCCURS IN TRANSPORT NETWORK

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE
BEFORE FAILURE OCCURS IN TRANSPORT NETWORK

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| TRANSPORT NODE 20-2 | ROUTER 11-2 | BB | NORMAL |
| TRANSPORT NODE 20-3 | ROUTER 11-3 | CC | NORMAL |
| TRANSPORT NODE 20-4 | ROUTER 11-4 | DD | NORMAL |
| | | | |

NEIGHBOR IP ROUTER DATABASE
BEFORE FAILURE OCCURS IN LINK TO ROUTER 11-2

45

| NETWORK ADDRESS | TRANSMISSION LSP | RECEPTION LSP | LSP STATE |
|---|---|---|---|
| BB | 10 | 100 | NORMAL |
| CC | 20 | 200 | NORMAL |
| DD | 30 | 300 | NORMAL |
| | | | |

ROUTING INFORMATION TABLE OF TRANSPORT NODE 20-1
BEFORE FAILURE OCCURS IN LINK TO ROUTER 11-2

| PATH SOURCE TRANSPORT NODE ID | PATH TERMINATE TRANSPORT NODE ID | LSP |
|---|---|---|
| TRANSPORT NODE 20-1 | TRANSPORT NODE 20-2 | 10 |
| TRANSPORT NODE 20-1 | TRANSPORT NODE 20-3 | 20 |
| TRANSPORT NODE 20-1 | TRANSPORT NODE 20-4 | 30 |
| TRANSPORT NODE 20-2 | TRANSPORT NODE 20-1 | 100 |
| TRANSPORT NODE 20-3 | TRANSPORT NODE 20-1 | 200 |
| TRANSPORT NODE 20-4 | TRANSPORT NODE 20-1 | 300 |

TRANSPORT NETWORK LOGICAL PATH DATABASE AFTER FAILURE OCCURS IN LINK TO ROUTER 11-2

25

| TRANSPORT NODE ID | ROUTER ID | NETWORK ADDRESS | STATE |
|---|---|---|---|
| TRANSPORT NODE 20-1 | ROUTER 11-1 | AA | NORMAL |
| TRANSPORT NODE 20-2 | ROUTER 11-2 | BB | FAILURE |
| TRANSPORT NODE 20-3 | ROUTER 11-3 | CC | NORMAL |
| TRANSPORT NODE 20-4 | ROUTER 11-4 | DD | NORMAL |
| | | | |

NEIGHBOR IP ROUTER DATABASE AFTER FAILURE OCCURS IN LINK TO ROUTER 11-2

45

92

| NETWORK ADDRESS | TRANSMISSION LSP | RECEPTION LSP | LSP STATE |
|---|---|---|---|
| BB | 10 | 100 | COMMUNICATION ALERT DETECTED |
| CC | 20 | 200 | NORMAL |
| DD | 30 | 300 | NORMAL |
| | | | |

ROUTING INFORMATION TABLE OF TRANSPORT NODE 20-1 AFTER FAILURE OCCURS IN LINK TO ROUTER 11-2

| NETWORK ADDRESS (61) | ACTIVE TRANSMISSION LSP (62) | ACTIVE RECEPTION LSP (63) | ACTIVE LSP STATE (64) | AUXILIARY TRANSMISSION LSP (65) | AUXILIARY RECEPTION LSP (66) | AUXILIARY LSP STATE (67) |
|---|---|---|---|---|---|---|
| BB | 10 | 100 | NORMAL | 20 | 200 | NORMAL |
| CC | 20 | 200 | NORMAL | 30 | 300 | NORMAL |
| DD | 30 | 300 | NORMAL | 10 | 100 | NORMAL |
| | | | | | | |

*Fig. 16*

DATA TRANSPORT SYSTEM AND CONTROL METHOD OF DATA TRANSPORT SYSTEM

CLAIM OF PRIORITY

The present application claims priority from Japanese patent application JP 2011-159863 filed on Jul. 21, 2011, the content of which is hereby incorporated by reference into this application.

BACKGROUND OF THE INVENTION

This invention relates to a technology for establishing a logical path between communication devices.

Telecommunication carriers that use a connection-oriented communication protocol to build a transport network are known. Examples of communication protocols for building a transport network include Multiprotocol Label Switching-Transport Profile (MPLS-TP), Provider Backbone Bridges (PBB), and Asynchronous Transfer Mode (ATM). With these communication protocols, an end-to-end logical path can be built to provide a highly confidential logical path. These communication protocols also have an Operation, Administration and Maintenance (OAM) function for monitoring the logical path for the presence or absence of a failure, and an Automatic Protection Switching (APS) function for automatically switching the logical path if a failure occurs in the logical path, which means that a highly reliable logical path can be built.

On the other hand, many ISPs and corporate users (hereinafter, referred to as transport network users) use routers, which are devices for transmitting and receiving data in accordance with the IP, to build a communication network. Routers exchange routing protocols with each other, to thereby autonomously collect a connection relation between the routers in the IP layer and generate routing information. The routing information is generated by all routers that are on the same communication network, and the routers all hold the same routing information. Each of the routers transmits and receives communication data along generated logical paths.

A transport network user rents a transport network from a telecommunication carrier and uses routers owned by the transport network user to connect bases with one another. FIG. 20 is a diagram illustrating an example of a conventional transport network provided by a telecommunication carrier and connection relations that are formed to connect bases of a transport network user to one another.

A transport network 3 of the telecommunication carrier is constituted of a plurality of transport nodes 1 (1-1 to 1-*n* (n is 4 in the example of FIG. 20)). The transport nodes 1-1 to 1-*n* have interface cards (IFs) 2 (2-1 to 2-*n*) for connecting to routers. A logical path 7 between two of the transport nodes 1-1 to 1-*n* is set fixedly to these two transport nodes by a transport network logical path management server 4. Information on a logical path between two of the transport nodes 1-1 to 1-*n* is saved in a transport network logical path database (DB) 5, which is kept by the transport network logical path management server 4. In other words, the transport network logical path management server 4 can keep track of the state of every logical path 7 in the transport network.

The logical path 7 between two of the transport nodes 1-1 to 1-*n* is a logical connection and may not match the physical connection in some cases.

Bases 10 (10-1 to 10-*n*) of the transport network user include routers 11 (11-1 to 11-*n*), which connect to the transport nodes 1-1 to 1-*n*, and include communication terminals 12 (12-1 to 12-*m*). For example, the base 10-1 of the transport network user includes the router 11-1, which connects to the transport node 1-1, and includes the communication terminals 12-1 and 12-2. The communication terminals 12-1 to 12-*m* are, for example, routers, personal computers, or similar information devices for connecting to other communication networks.

In a mode where the routers 11-1 to 11-*n* and the transport nodes 1-1 to 1-*n* are connected in this manner, when the transport node 1-*x* (1≤x≤n) receives through the interface 2-*x* an IP packet and a routing packet that are transmitted from the router 11-*x*, the interface 2-*x* determines, based on the address for a protocol of a layer below the IP layer (for example, a Mandatory Access Control (MAC) address), which of logical paths 7 (7-1 to 7-*l*) in the transport network to use for the transfer of the packets. The packets for which the interface 2-*x* has determined a logical path are processed also in the interface 2-*x* into a data transfer mode of the transport network, and then are transferred to the transport node 1-*y* (1≤y≤n, y≠x), which is connected to the objective router 1-*y*.

Japanese Patent Application Laid-open No. 2010-246138, Japanese Patent No. 3910200, and Japanese Patent Application Laid-open No. 2000-183919 can be given as the related art in which routers are connected to one another via a transport network.

FIG. 21 illustrates connection modes of the IP layer and the transport layer in which routers are connected to one another referring to Japanese Patent Application Laid-open No. 2010-246138 and Japanese Patent No. 3910200. Illustrated in FIG. 21 are connection modes of a transport layer 6 and of an IP layer 13. The communication terminals 12-1 to 12-*m* connected to the routers 11-1 to 11-*n* are omitted from FIG. 21 for simplification, as well as the transport network logical path management server 4, a transport network logical path DB 5, and the IFs 2-1 to 2-*n*.

The logical paths 7-1 to 7-*l* of the transport layer 6 are set by the transport network logical path management server 4, and all logical path relations are saved in the transport network logical path DB 5.

The connection relations in the IP layer 13 are generated autonomously by the routers 11-1 to 11-*n* by exchanging routing protocols among the routers 11-1 to 11-*n*. Setting the logical paths 7-1 to 7-*l* in the transport layer 6 which constitute a full-mesh topology connecting the routers to one another puts all routers that are connected to the transport network 3 in an adjacency relation. Router-to-router logical paths 14 (14-1 to 14-*l*) managed by each router accordingly constitute a full-mesh topology that connects the routers 11-1 to 11-*n* to one another as illustrated in solid lines in FIG. 21.

Information on the logical paths 14-1 to 14-*l* of the IP layer 13 is held by all the routers. An increase in the number of routers connected to the transport network 3 therefore means an exponential increase in the amount of routing information held by each router. Another problem arises when, for example, a path failure occurs between the transport node 1-2 and the transport node 1-3, resulting in the loss of a path that directly connects the router 11-2 and the router 11-3, and the router 11-2 and the router 11-3 recalculate a path to set a new route. The router 11-2 and the router 11-3 transfer a routing protocol that prompts recalculation of logical paths to all the rest of routers, including ones whose communication is not affected by this failure, for example, the router 11-1 and the router 11-4, and the routers respectively execute recalculation of routing information.

SUMMARY OF THE INVENTION

Because each router thus shares routing information of all routers that are in an adjacency relation with the router, an increase in the number of connected routers increases the amount of routing information and the load of path calculation on each router as well. Router venders therefore, in general, recommend keeping the number of routers that are installed in the same routing area around fifty. This means that a large-scale router communication network using a transport network cannot be built with the conventional method.

In the case of a technology described in Japanese Patent Application Laid-open No. 2000-183919, transport nodes are equipped with a routing processing function to terminate a routing protocol received from a router. An IF card of a transport node uses a routing protocol to check the connection configuration in the transport network and notifies other transport nodes of the fact that a router has been connected. This makes the number of neighbor routers seem small to the router connected to the transport node and accordingly lessens the load on the router. However, the exchange of routing protocols between the transport nodes increases the control load on the transport nodes. A large-scale transport network therefore cannot be built.

It is an object of this invention to provide a data transport system capable of building a highly scalable transport network by reducing the load of calculating a path between communication devices that connect to transport nodes.

An exemplary embodiment of this invention is a data transport system including a plurality of transport nodes which are constituents of a transport network, a plurality of communication devices which communicate via the transport network, a transport network logical path management server for setting logical paths between the plurality of transport nodes within the transport network, a logical path database for saving information about the logical paths between the plurality of transport nodes set by the transport network logical path management server, and a logical path control server for establishing logical paths between the plurality of communication devices via the transport network. In a case where a first communication device is newly connected with a first transport node of the plurality of transport nodes, the first communication device transmits control data to the logical path control server via the first transport node. The logical path control server obtains information about a connection relation between the first communication device and the first transport node from the control data, and establishes a logical path between the first communication device and a second communication device of the plurality of communication devices based on the obtained information about the connection relation and on the information about the logical paths between the plurality of transport nodes saved in the logical path database.

According to an exemplary embodiment of this invention, the path calculation load on communication devices is lessened, and a communication network using a highly scalable transport network can thus be provided.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 5 is a diagram illustrating an example of a routing information table.

FIG. 6 is a diagram illustrating an example of the contents of a transport network logical path DB which is kept by a transport network logical path management server.

FIG. 7 is a diagram illustrating an example of a neighbor IP router DB which is kept by a virtual router control server.

FIG. 10A is a diagram illustrating an example of how the transport network logical path database, the neighbor IP router database, and the routing information table look before the router is connected.

FIG. 10B is a diagram illustrating an example of how the transport network logical path database, the neighbor IP router database, and the routing information table look after the router is connected.

FIG. 12A is a diagram illustrating an example of how the transport network logical path database, the neighbor IP router database, and the routing information table look before the transport network failure occurs.

FIG. 12B is a diagram illustrating an example of how the transport network logical path database, the neighbor IP router database, and the routing information table look after the transport network failure occurs.

FIG. 14A is a diagram illustrating an example of how the transport network logical path database, the neighbor IP router database, and the routing information table look before the failure between the transport node and the router occurs.

FIG. 14B is a diagram illustrating an example of how the transport network logical path database, the neighbor IP router database, and the routing information table look after the failure between the transport node and the router occurs.

FIG. 16 is a diagram illustrating an example of the contents of an entry in a routing information table of a transport node according to a second embodiment of this invention.

DETAILED DESCRIPTION OF THE PREFERRED EMBODIMENTS

Embodiments of this invention are described below with reference to the drawings. The following description takes as an example the case where MPLS-TP is used as the communication protocol of a transport network, but the same effect is obtained irrespective of which communication protocol is used in the transport network. It also should be noted that, while the following description takes as an example Open Shortest Path First (OSPF) as the routing protocol used by routers, the same effect is obtained with other routing protocols that operate in a similar manner.

First Embodiment

Figure 1:
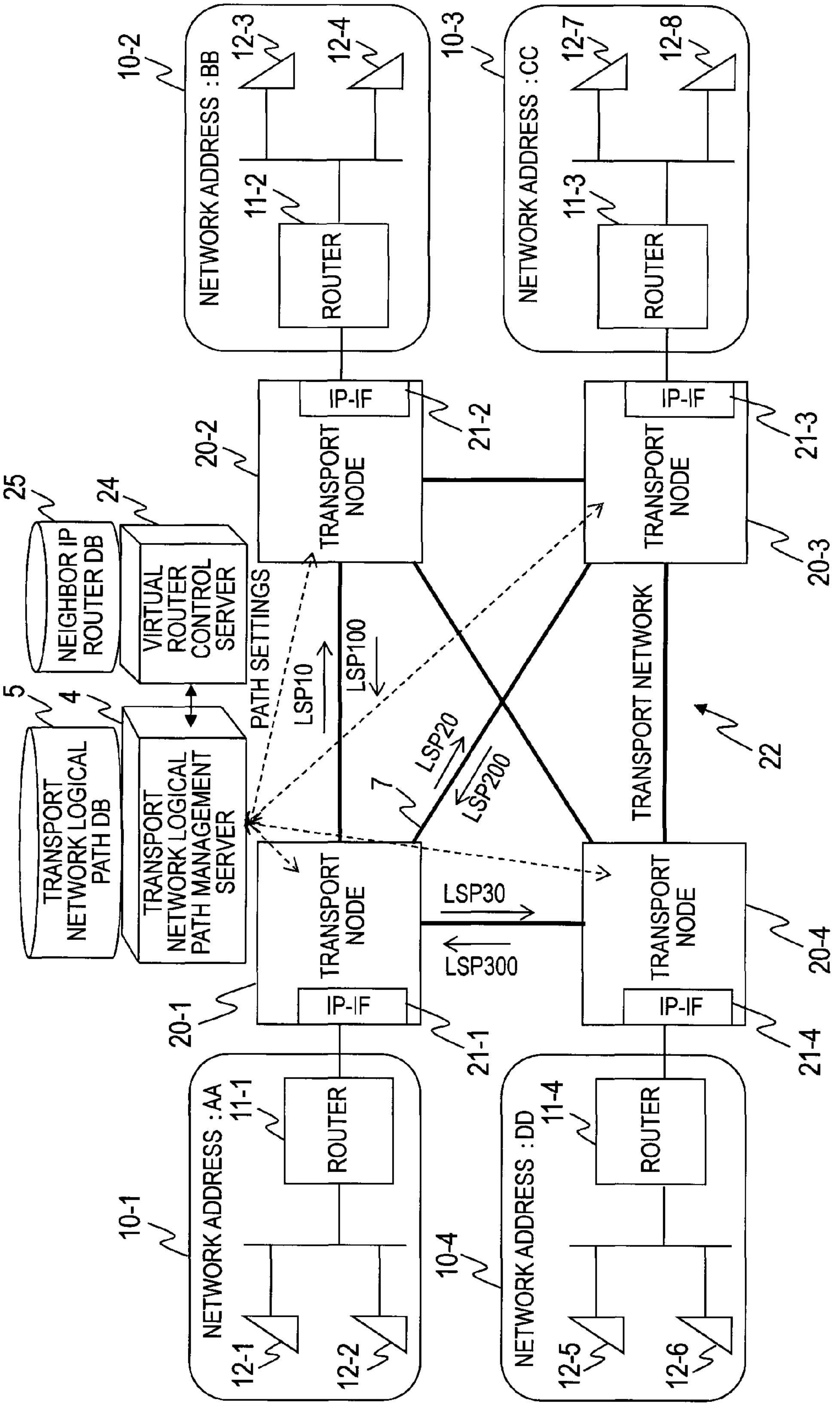
FIG. 1 is a diagram illustrating an example in which routers owned by a transport network user are connected to a data transport system according to a first embodiment of this invention.

FIG. 1 is a diagram illustrating an example in which routers owned by a transport network user are connected to a data transport system according to a first embodiment of this invention.

In the data transport system of FIG. 1, a telecommunication carrier provides a transport network 22 and the transport network user rents logical paths 7 of the transport network 22 from the telecommunication carrier. Four sites of the transport network user which are geographically distant from one another and which are denoted by 10-1 to 10-4 (bases 10-1 to **10-*n*, n is 4 in FIG. 1) are connected to one another via the transport network 22** of the telecommunication carrier.

The bases 10-1 to **10-*n* of the transport network user include routers (communication devices) 11 (11-1 to 11-*n*), which connect to the transport nodes 20 (20-1 to 20-*n*), and include communication terminals 12 (12-1 to 12-*m*). The communication terminals 12-1 to 12-*m*** are, for example, routers, personal computers, or similar information devices for connecting to other communication networks.

A network address is set to each of the bases of the transport network user. Usually, a network address is expressed in prefix notation, such as 192.168.1.0/24 in IPv4. Here, the network addresses of the respective bases are simplified as AA, BB, CC, and DD.

The operation of the routers is described briefly. The routers use a routing protocol to exchange with one another the network addresses of their own bases and the network addresses of other router networks connected to their own bases (these are called routing information), and to thereby autonomously learn what router networks are present around themselves. The routers also generate a routing table from the routing information learned through the exchange of routing packets.

The routing table holds a network address, a next hop address, which is the IP address of a neighbor router, an IF number at which the neighbor router having the next hop address is connected, and the like. When one of the routers receives an IP packet, the router executes a cross-reference search for a network address in the routing table and the destination IP address, and transfers the IP packet to a neighbor router that is associated with a network address closest to the destination IP address.

The data transport system of the telecommunication carrier includes the transport nodes 20 (20-1 to **20-*n*), a transport network logical path management server 4, and a virtual router control server (logical path control server) 24. The transport network 22 is built from the plurality of transport nodes 20-1 to 20-*n*. The transport network logical path management server 4 and the virtual router control server 24 are separate servers in FIG. 1**, but the same effect is obtained also when the functions of these servers are implemented in a single server.

The transport nodes 20-1 to **20-*n* which constitute the transport network 22 hold IP-IF cards 21 (21-1 to 21-*n*) for connecting to the routers, intermediate IFs (not shown) for connecting the transport nodes to one another, and control IFs (not shown) for connecting to the transport network logical path management server 4 and to the virtual router control server 24**.

MPLS-TP which is being standardized by the Internet Engineering Task Force (IETF) is used as the communication protocol of the transport network 22. MPLS-TP has a feature of turning data received from a neighbor node that connects to the receiver transport network into an MPLS frame format in which data is encapsulated with the use of an MPLS label and, within the transport network, transferring the MPLS frame to the destination transport node based on the MPLS label used in the encapsulation.

The transport network logical path management server 4 sets the logical paths 7, which are each a point-to-point path between two of the transport nodes 20-1 to **20-*n*, in the respective transport nodes 20-1 to 20-*n*. Information on all of the logical paths 7 between the transport nodes 20-1 to 20-*n* within the transport network 22 is stored in a transport network logical path database (DB) 5, which is kept by the transport network logical path management server 4. The transport network logical path management server 4 can therefore keep track of the state of every logical path 7 in the transport network. The logical paths 7 between the transport nodes 20-1 to 20-*n*** are logical connections and may not match physical connections.

In the example of FIG. 1, a transmission LSP 10 and a reception LSP 100 are set between the transport node 20-1 and the transport node 20-2, a transmission LSP 20 and a reception LSP 200 are set between the transport node 20-1 and the transport node 20-3, and a transmission LSP 30 and a reception LSP 300 are set between the transport node 20-1 and the transport node 20-4.

The virtual router control server 24 receives via the transport nodes 20-1 to **20-*n* routing packets transmitted by the routers of the transport network user toward the transport network 22, and analyzes the routing packets. When it is found as a result of the analysis that a received routing packet is transmitted from one of the routers to advertise a network address, the virtual router control server 24 collects the network address from the packet. The virtual router control server 24 also obtains from the transport network logical path DB 5 the connection relations of the transport node 20-*x* ($1 \le x \le n$) which is the recipient of the routing packet with the rest of the transport nodes 20-1 to 20-*n*, and sets the relation of the collected network address with the logical paths 7 in the IP-IF cards 21-1 to 21-*n* of the respective transport nodes 20-1 to 20-*n***.

Figure 4:
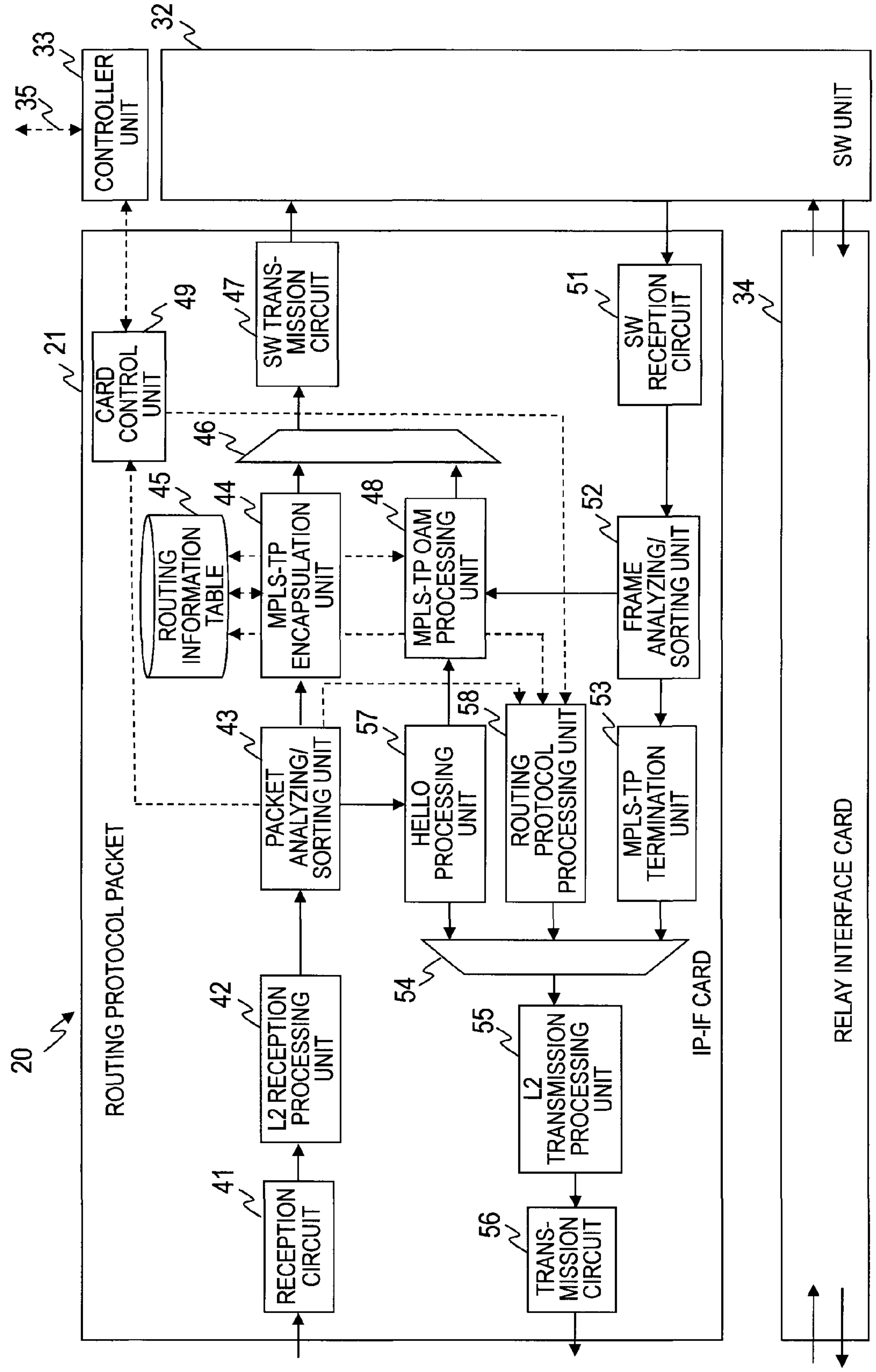
FIG. 4 is a diagram illustrating the configuration of a transport node in which an IP-IF card is mounted according to the first embodiment.

FIG. 4 is a diagram illustrating the configuration of each of the transport nodes 20 in which the IP-IF cards 21 are mounted according to the first embodiment. The transport node 20 includes at least one controller unit 33, a switch (SW) unit 32, at least one relay interface (IF) card 34, and at least one IP-IF card 21. The controller unit 33, the SW unit 32, the relay IF card 34, and the IP-IF card 21 are connected to one another. In the drawing, the solid arrows indicate the flow of main signals and the dashed arrows indicate the flow of control signals.

The controller unit 33 includes a control IF 35 for connecting to the transport network logical path management server 4 and the virtual router control server 24. The controller unit 33 sets settings information received from the transport network logical path management server 4 and the virtual router control server 24 in the SW unit 32, the relay IF card 34, and the IP-IF card 21. The controller unit 33 also has a function of transferring to the virtual router control server 24 a routing packet that has been transferred from the IP-IF card 21.

The SW unit 32 analyzes MPLS frames received from the respective IF cards to identify the transfer destination of received data, and hands over the data to a suitable one of the relay IF card 34 and the IP-IF card 21. The relay IF card 34 is an interface for connecting to other transport nodes 20 that constitute the transport network 22. The relay IF card 34 can be a known relay IF card. A detailed description on the relay IF card 34 is therefore omitted, except that the relay IF card 34 includes, among others, transmission/reception circuits for transmitting/receiving data between the SW unit 32 and the transport network 22, and a card control unit having a function of communicating to/from the controller unit 33.

The IP-IF card 21 includes a card control unit 49, a reception circuit 41, a Layer 2 (L2) reception processing unit 42, a packet analyzing/sorting unit 43, an MPLS-TP encapsulation unit 44, a routing information table 45, a scheduler 46, an SW transmission circuit 47, an MPLS-TP OAM processing unit 48 (hereinafter, referred to as OAM processing unit 48), an SW reception circuit 51, a frame analyzing/sorting unit 52, an MPLS-TP termination unit 53, a scheduler 54, an L2 transmission processing unit 55, a transmission circuit 56, a Hello processing unit 57, and a routing protocol processing unit 58.

The card control unit 49 connects to the controller unit 33, and has a function of setting in the components of the IP-IF card 21 settings information notified from the controller unit 33, and a function of reading information that is set in the components of the IP-IF card 21 to notify the read information to the controller unit 33. The card control unit 49 also has a function of relaying to the controller unit 33 a routing packet that has been transferred from the packet analyzing/sorting unit 43, and a function of transferring to the routing protocol processing unit 58 a routing packet that has been transferred from the controller unit 33.

The reception circuit 41 receives data from a neighbor router.

The L2 reception processing unit 42 terminates a protocol of the data link layer of the Open Systems Interconnection (OSI) Reference Model which connects a neighbor router to the transport node. When the data link layer protocol is, for example, Ethernet (trademark), the L2 reception processing unit 42 executes processing of terminating an Ethernet frame. The L2 reception processing unit 42 also learns the sender MAC address of a received Ethernet frame and shares the information with the L2 transmission processing unit 55.

The packet analyzing/sorting unit 43 analyzes data received from the L2 reception processing unit 42 to sort the data into routing packets and data packets. When the received data is a data packet, the packet analyzing/sorting unit 43 transfers the received data to the MPLS-TP encapsulation unit 44. When the received data is a routing packet, the packet analyzing/sorting unit 43 identifies the type of the routing packet. In the case where the routing packet is a Hello packet for detecting a neighbor router and checking connection to the neighbor router, the packet analyzing/sorting unit 43 transfers the Hello packet to the Hello processing unit 57. In the case where the routing packet is a Link State Request (LSR) packet for requesting a neighbor router to provide routing information, the packet analyzing/sorting unit 43 transfers the LSR packet to the routing protocol processing unit 58 and the card control unit 49. In the case where other types of routing packets are received, the packet analyzing/sorting unit 43 transfers the received routing packets to the card control unit 49.

The MPLS-TP encapsulation unit 44 obtains the destination IP address of a data packet, and performs longest matching against network addresses in the routing information table 45 to obtain the value of a transmission Label Switching Path (LSP) 62 as a logical path along which the data packet is to be transferred. The MPLS-TP encapsulation unit 44 further generates an MPLS label from the obtained LSP, encapsulates the data packet in the MPLS-TP format, and transfers the data packet to the scheduler 46.

The routing information table 45 is described with reference to FIG. 5. FIG. 5 is a diagram illustrating an example of the routing information table 45. The routing information table 45 includes in each entry a network address 61, the transmission LSP 62, a reception LSP 63, and an LSP state 64. A value given from the virtual router control server 24 is set as the network address 61. Values given from the transport network logical path management server 4 are set as the transmission LSP 62 and the reception LSP 63. The state of an LSP which is a logical path within the transport network is set as the LSP state 64 by the OAM processing unit 48. The routing information table 45 is referred to by the MPLS-TP encapsulation unit 44, the OAM processing unit 48, the routing protocol unit 58, and the card control unit 49.

The scheduler 46 arbitrates between MPLS frame outputs from the MPLS-TP encapsulation unit 44 and the OAM processing unit 48. The scheduler 46 transfers a received MPLS frame to the SW transmission circuit 47.

The SW transmission circuit 47 transfers to the SW unit 32 an MPLS frame received from the scheduler 46.

The OAM processing unit 48 has a continuity check function for monitoring the normality of LSPs set in the routing information table 45, an access link monitoring function for monitoring a link that connects to a router for a failure, and a transport network failure detecting function for detecting a failure in the transport network.

The continuity check function of the OAM processing unit 48 is implemented by generating/terminating a continuity check (CC) frame. The OAM processing unit 48 refers to the routing information table 45 to generate/transmit a CC frame in fixed cycles for each transmission LSP 62 registered. The OAM processing unit 48 also monitors each reception LSP 63 registered to see whether a CC frame is received in fixed cycles. The received CC frame is transferred from the packet analyzing/sorting unit 52. In the case where one reception LSP 63 stops receiving CC frames for a given period of time, the OAM processing unit 48 determines that some kind of failure has occurred in the LSP that has stopped receiving CC frames, and registers a loss of CC (LOC) detection state as the LSP state 64 in an entry of the routing information table 45 for this reception LSP. A condition required of this LSP to be deemed recovered from the LOC detection state is a continued reception of CC frames in the LSP for a given period of time.

The access link monitoring function of the OAM processing unit 48 generates/inserts a Client Signal Fail (CSF) frame in the relevant transmission LSP 62 set in the routing information table 45 when the reception circuit 41 detects the disconnection of a physical connection to the router at the opposite end of the link, or when the Hello processing unit 57 detects that the reception of Hello packets from the router at the opposite end has ceased for a given period of time. This enables the transport node at the opposite end of the transmission LSP to detect that a failure has occurred in the access link to the router.

The access link monitoring function also has a function of terminating a CSF frame received from a logical path that is associated with the relevant reception LSP 63 set in the routing information table 45. The OAM processing unit 48 registers a CSF detection state as the LSP state 64 in an entry of the routing information table 45 for the reception LSP where the CSF frame has been received. An access link failure in the transport node at the opposite end of the reception LSP can thus be detected. A condition required of this LSP to be deemed recovered from the CSF detection state is a continued cessation of CSF frame reception in the LSP for a given period of time. When the LSP recovers from the CSF detection state, the OAM processing unit 48 deletes the CSF detection state registered as the LSP state 64 of the LSP from the routing information table 45.

The transport network failure detecting function of the OAM processing unit 48 has a function of detecting some kind of failure in other transport nodes that constitute the transport network and terminating forward defect indication (Alarm Indication Signal (AIS) and Link Down Indication (LDI)) frames for notifying the failure to LSPs that will undergo a communication failure due to the detected failure. The OAM processing unit 48 registers an AIS detection state or an LDI detection state as the LSP state 64 in an entry of the routing information table 45 for an LSP where the AIS frame or the LDI frame has been received. This enables the transport node 20 in question to detect a communication failure in the LSP due to a failure that has occurred in one of the other transport nodes 20 constituting the transport network 22. A condition required of this LSP to be deemed recovered from the AIS detection state or the LDI detection state is a continued cessation of AIS/LDI frame reception in the LSP for a given period of time. When the LSP recovers from the AIS/LDI detection state, the OAM processing unit 48 deletes the AIS/LDI detection state registered as the LSP state 64 of the LSP from the routing information table 45.

The SW reception circuit 51 receives frames from the SW unit 32 and transfers the frames to the frame analyzing/sorting unit 52.

The frame analyzing/sorting unit 52 analyzes received MPLS frames to sort the frames into data frames and MPLS-TP OAM frames. The frame analyzing/sorting unit 52 transfers a data frame to the MPLS-TP termination unit 53 and transfers an MPLS-TP OAM frame to the OAM processing unit 48.

The MPLS-TP termination unit 53 decapsulates an MPLS-TP header from a received MPLS frame, extracts an IP packet, and transfers the received packet to the scheduler 54.

The scheduler 54 arbitrates among IP packet outputs from the Hello processing unit 57, the routing protocol processing unit 58, and the MPLS-TP termination unit 53. The scheduler 54 transfers a received IP packet to the L2 transmission processing unit 55.

The L2 transmission processing unit 55 receives an IP packet from the scheduler 54, generates an MAC header from an MAC address about which the L2 transmission processing unit 55 shares information with the L2 reception processing unit 42, and transfers the received IP packet to the transmission circuit 56 after attaching the MAC header to the IP packet.

The transmission circuit 56 transmits an IP packet received from the L2 transmission processing unit 55 to the router 11.

The Hello processing unit 57 exchanges Hello packets with the router 11 that is connected directly to its own IP-IF card 21 to monitor the normality of communication to/from this router 11. When detecting that a router has been connected to the IP-IF card 21, the Hello processing unit 57 cyclically generates a Hello packet and transmits the Hello packet to the scheduler 54. The Hello processing unit 57 also monitors whether the IP-IF card 21 is receiving a Hello packet cyclically. When detecting that Hello packets have not been received, the Hello processing unit 57 determines that some kind of failure has occurred between the IP-IF card 21 and the router 11 directly connected to the IP-IF card 21, and issues a CSF generation instruction to the OAM processing unit 48. When the reception of Hello packets from the router 11 is resumed, the Hello processing unit 57 cancels the CSF generation instruction given to the OAM processing unit 48.

The routing protocol processing unit 58 has a function of performing processing of inserting a routing packet that is transferred from the virtual router control server 24, an LSR packet termination processing function, and a function of generating and inserting a Type 3 summary-LSA of a Link State Advertisement (LSA) packet for notifying routing information with an update of the routing information table 45 or LSR termination as a trigger.

Described next with reference to FIGS. 1, 5, and 6 is a procedure in which the transport network logical path management server 4 sets an LSP which is a logical path between two of the transport nodes 20-1 to 20-*n*.

FIG. 6 is a diagram illustrating an example of the contents of the transport network logical path DB 5, which is kept by the transport network logical path management server 4. Each entry of the transport network logical path DB 5 is constituted of values of a path source transport node ID 71 of a transport node that is the start point of a logical path, a path terminate transport node ID 72 of a transport node that is the end point of the logical path, and an LSP 73 which is the logical path set between the two transport nodes. In the case of transport nodes that include a plurality of IF cards, the node IDs may include information for identifying a relevant IF card and for identifying physical port information of the IF card. Different node IDs are assigned to the same node in this case if different IF cards or physical ports are used.

In MPLS-TP, a logical path is set one way at a time. Setting a two-way logical path between the transport node 20-1 and the transport node 20-2, for example, therefore requires LSP settings that specify a logical path having the transport node 20-1 as the source ID and the transport node 20-2 as the terminate ID, and LSP settings that specify a logical path having the transport node 20-2 as the source ID and the transport node 20-1 as the terminate ID. In the case where the transport network 22 employs a communication protocol capable of establishing a two-way logical path with a single logical path ID, the transport network logical path DB 5 is formatted to hold only the IDs of two transport nodes and the ID of a logical path that connects the two transport nodes to each other.

A logical path between two of the transport nodes 20-1 to 20-*n* is set via the transport network logical path management server 4 by a system maintenance person of the telecommunication carrier that maintains and runs the transport nodes. The system maintenance person registers via the server 4 the ID of a transport node that is the start point of a logical path to be established between two of the transport nodes 20-1 to **20-*n*, the ID of a transport node that is the end point of the logical path, and the LSP value of the logical path which connects the two transport nodes. In an actual transport network, there are a plurality of intermediate nodes between a source transport node and a terminate transport node, and the system maintenance person also sets on the management server the intermediate nodes along the logical path. Registration information of intermediate nodes is omitted from FIG. 6** for simplification.

In the example of FIG. 6, the system maintenance person has registered three logical paths, 10, 20, and 30, which have the transport node 20-1 as the start point and the transport nodes 20-2, 20-3, and 20-4 as the end points, respectively. Once these values are registered, values 10, 20, and 30 are set in the routing information table 45 of the transmission node 20-1 illustrated in FIG. 5 in the field for the transmission LSP 62 of relevant entries. The values 10, 20, and 30 are also respectively set in the routing information table of the transport node 20-2 in the field for the reception LSP 63, in the routing information table of the transport node 20-3 in the field for the reception LSP 63, and in the routing information table of the transport node 20-4 in the field for the reception LSP 63.

The system maintenance person next uses the same procedure to set paths that have the transport nodes 20-2, 20-3, and 20-4 as the start points and the transport node 20-1 as the end point. Two-way logical paths between the transport node 20-1 and the transport nodes 20-2, 20-3, and 20-4 are thus established.

In the routing information table 45 of the transport node 20-1 at the time these settings are completed, the fields for the transmission LSP 62 and the reception LSP 63 are set as illustrated in FIG. 5. The field for the network address 61 remains empty while no router is connected.

Two-way logical paths that connect the transport nodes 20-2, 20-3, and 20-4 to one another are further set by the same procedure, with the result that full-mesh logical paths are set to connect the transport nodes 20-1 to **20-*n*** to one another.

Information on these logical paths is saved in the transport network logical path DB 5. Information on all connections between transport nodes can therefore be collected by referring to the transport network logical path DB 5.

A description is given next with reference to FIGS. 7, 8, 9, 10A, and 10B on how the virtual router control server 24 and the transport nodes 20-1 to **20-*n* operate when the router 11-*x* (1≤x≤n) is connected to the transport node 20-*x*. The premise of the description is that the logical paths 7 between the transport nodes 20-1 to 20-*n* are already set before the router 11-*x*** is connected.

Details of an initial setting operation that is executed among the routers 11-1 to **11-*n*, the transport nodes 20-1 to 20-*n*, and the virtual router control server 24 when the router 11-*x*** is connected are described later.

FIG. 7 is a diagram illustrating an example of a neighbor IP router DB 25, which is kept by the virtual router control server 24. The neighbor IP router DB 25 includes in each entry a transport node ID 81, a router ID 82, which indicates the ID of a router connected to a transport node that has the transport node ID 81, a network address 83, which indicates a network address advertised by the router, and a connection state 84, which indicates the state of connection to the router.

A case where the router 11-1 is connected to the transport node 20-1 is described first. This involves executing commands for setting a routing protocol, routing information, and the like among the router 11-1, the transport node 20-1, and the virtual router control server 24, and a new entry is registered in the neighbor IP router DB 25. A network address is also registered in the routing information tables of the transport nodes 20-2, 20-3, and 20-4.

While the router 11-1 is connected, "transport node 20-1", "router 11-1", "AA", and "normal" are registered in the neighbor IP router DB 25 as the transport node ID 81, the router ID 82, the network address 83, and the connection state 84, respectively. The transport network logical path DB 5, the neighbor IP router DB 25, and the routing information table 45 of the transport node 20-1 at this point are as illustrated by S41 of FIG. 10A.

A setting procedure that is executed when the router 11-2 is connected to the transport node 20-2 is described next with reference to FIGS. 8, 9, 10A, and 10B.

Figure 8:
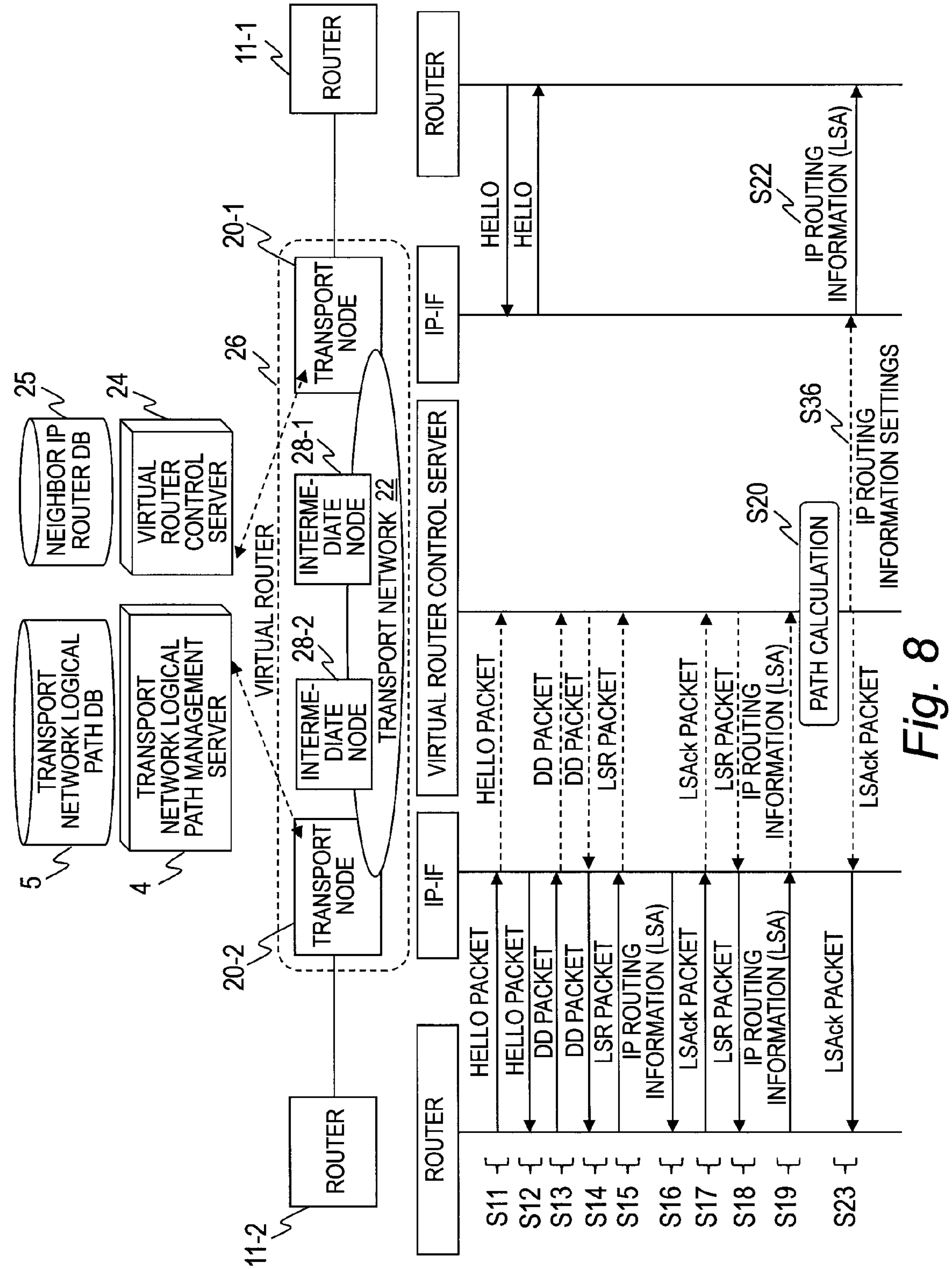
FIG. 8 is a diagram illustrating a setting sequence that takes place when a router is connected to a transport node.

FIG. 8 is a diagram illustrating a setting sequence that takes place when the router 11-2 is connected to the transport node 20-2.

When connected to the transport node 20-2, the router 11-2 transmits to the transport node 20-2 a Hello packet in order to search for neighbor routers (S11).

The IP-IF cards 21 are capable of the processing of terminating Hello packets, which can be processed without requiring special calculation or the like, but the transport node 20-2 transfers to the virtual router control server 24 a Hello packet that is received first since the router 11-2 has been connected. This is for notifying the virtual router control server 24 of the fact that an initial sequence is about to start between the transport node 20-2 and the new router. The controller unit 33 transfers this Hello packet with a transport node ID and IP-IF card information attached thereto so that the virtual router control server 24 can know which IP-IF card 21 of which transport node 20 has received the routing packet. Routing packets transferred from the transport nodes 20-1 to **20-*n* to the virtual router control server 24** have a transport node ID and IP-IF card information attached thereto, which is omitted from the following description of the sequence.

The IP-IF card 21 of the transport node 20-2 receives the Hello packet and returns a Hello packet to the router 11-2 in response to the received Hello packet (S12).

The router 11-2 receives the returned Hello packet to know of the presence of neighbor routers, and then transfers a Database Description (DD) packet to the transport node 20-2. The DD packet is transferred from the IP-IF card 21 of the transport node 20-2 via the controller unit 33 to the virtual router control server 24 (S13).

Receiving the DD packet, the virtual router control server 24 recognizes that a router has been connected to the transport node 20-2 and transmits a DD packet to the transport node 20-2. Each DD packet transmitted by the virtual router control server 24 has attached thereto a transport node ID and IP-IF card information of the recipient of the DD packet. The DD packet transmitted by the virtual router control server 24 to the transport node 20-2 is transferred to the router 11-2 via the controller unit 33 and the IP-IF card 21 (S14). Routing packets transmitted from the virtual router control server 24 to the transport nodes 20-1 to **20-*n*** have attached thereto a transport node ID and IP-IF card information, which are omitted from the following description of the sequence.

Receiving the DD packet, the router 11-2 next transmits an LSR packet for requesting routing information to the transport node 20-2. The LSR packet is transferred to the routing protocol processing unit 58 of the IP-IF card 21 of the transport node 20-2 and to the virtual router control server 24 (S15).

The routing protocol processing unit 58 receives the LSR packet and searches the routing information table 45 to generate an LSA packet for notifying routing information from the network address 61 that has been set, and transmits the LSA packet to the router 11-2 (S16). The router 11-1 is the only router connected to the transport network 22 at this point, and network address information contained in the LSA packet is therefore a network address "AA" obtained from the router 11-1.

The virtual router control server 24 can generate an LSA packet as well. In the case where an LSA packet is generated in the virtual router control server 24, the virtual router control server 24 collects, for LSA packet generation, from the transport network logical path DB 5 and the neighbor IP router DB 25, the network address of a router connected to a transport node that has a connection relation with a transport node from which an LSR packet has been received. The router 11-1 is the only router connected to the transport network 22 at this point, and network address information contained in the LSA packet that is generated by the virtual router control server 24 is therefore a network address "AA" obtained from the router 11-1.

Receiving the LSA packet, the router 11-2 updates routing information kept in the router 11-2, and transmits a Link-state Acknowledgement (LSAck) packet to the transport node 20-2 (S17). The LSAck packet is terminated by the routing protocol processing unit 58 of the IP-IF card 21 of the transport node 20-2.

The IP-IF cards 21 are capable of the processing of terminating LSAck packets, which can be processed without requiring special calculation or the like, but the transport node 20-2 transfers to the virtual router control server 24 an LSAck packet received first since the router 11-2 has been connected. This is because, in the initial sequence, an LSR packet needs to be transmitted to the newly connected router after the LSAck packet is received, and transferring the LSAck packet to the virtual router control server 24 lets the virtual router control server 24 know when to generate an LSR packet.

Receiving the LSAck packet, the virtual router control server 24 transmits an LSR packet to the transport node 20-2 in order to collect routing information that is kept in the newly connected router. The LSR packet transmitted by the virtual router control server 24 is transmitted to the router 11-2 from the IP-IF card 21 via the controller unit 33 of the transport node 20-2, to which the router is newly connected (S18).

The router 11-2 receives the LSR packet, generates an LSA packet based on the routing information that is managed by itself, and transmits the LSA packet to the transport node 20-2. Receiving the LSA packet, the IP-IF card 21 of the transport node 20-2 transfers the LSA packet via the controller unit 33 to the virtual router control server 24 (S19).

The virtual router control server 24 receives the LSA packet and collects connection relations between transport nodes from the transport network logical path DB 5. Based on data contained in the received LSA packet, the virtual router control server 24 identifies the IP-IF cards 21 of some of the transport nodes 20-1 to 20-*n* that need an update of the routing information table 45, and executes path calculation processing for figuring out how each routing information table 45 that needs an update is to be updated (S20).

Figure 9:
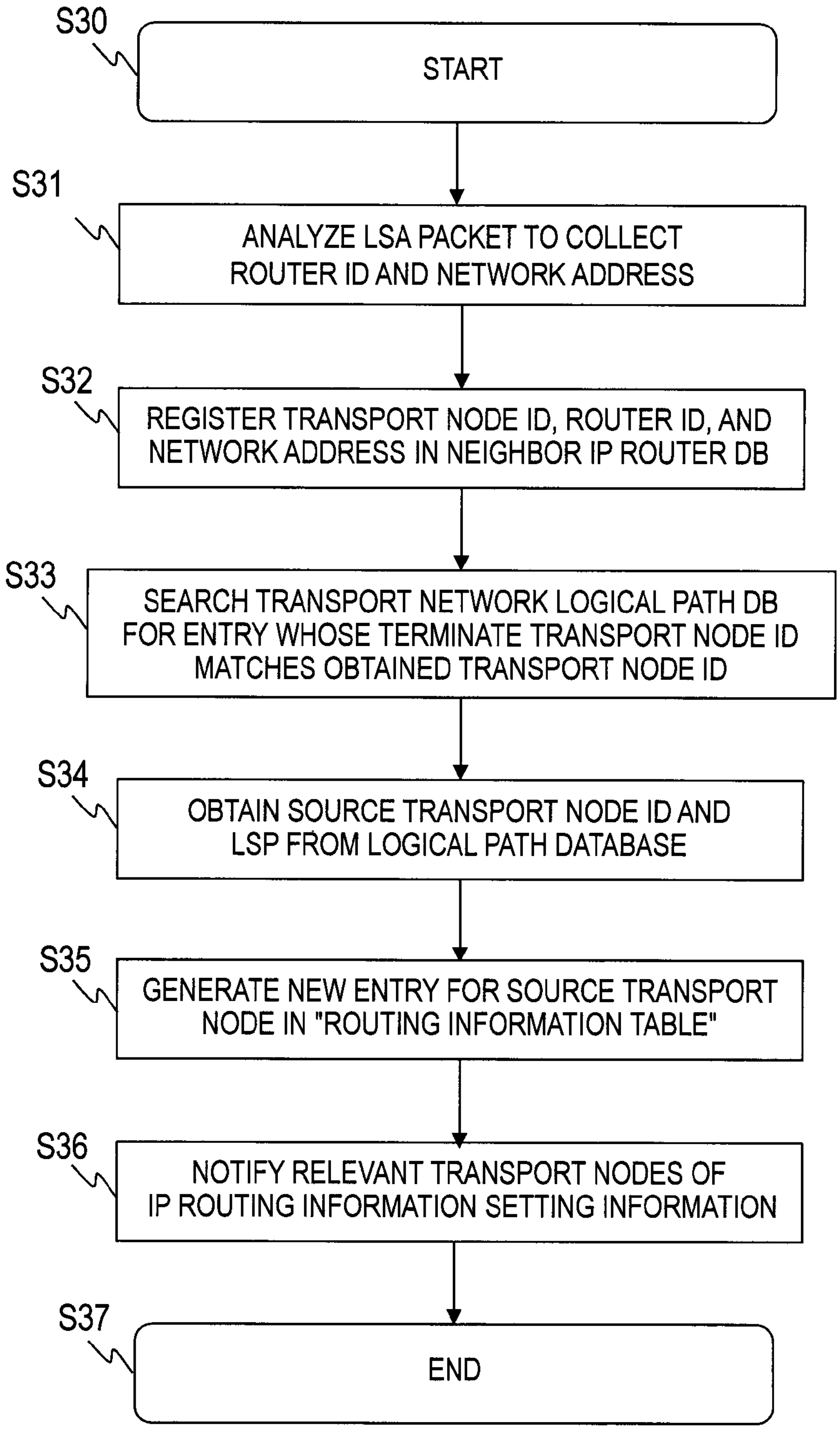
FIG. 9 is a flow chart illustrating the specifics of path calculation processing which is executed by the virtual router control server.

The path calculation processing executed by the virtual router control server 24 is described in detail with reference to a flow chart of FIG. 9. The flow chart of FIG. 9 illustrates processing that is executed by the virtual router control server 24 when an LSA packet is received no matter what the state is.

The processing of the flow chart is started when the virtual router control server 24 receives an LSA packet (S30).

The virtual router control server 24 analyzes the received LSA packet to collect a router ID and an address prefix (S31).

Based on the ID of a transport node from which the LSA packet has been transferred, the router ID, and the network address, the virtual router control server 24 generates a new entry in the neighbor IP router DB 25 and registers the values in the new entry (S32). In this example, where a router ID and a network address "BB" are obtained from the router 11-2, "transport node 20-2", "router 11-2", and "BB" are registered as the transport node ID 81, the router ID 82, and the network address 83, respectively, in the neighbor IP router DB 25. "Normal" is registered as the state 84. The contents of the neighbor IP router DB 25 in which the new entry has been registered are updated from data of S41 of FIG. 10A to data of S42 of FIG. 10B.

The LSA packet transmitted from the router 11-2 stores only one network address, BB, in this example, but the router 11-2 may have a plurality of network addresses in some cases. The LSA packet in this case stores a plurality of network addresses. When this LSA packet is received, the virtual router control server 24 generates a plurality of entries that have the same transport node ID, the same router ID, and different network addresses.

The virtual router control server 24 checks whether or not the transport network logical path DB 5 has an entry whose terminate transport node ID matches the obtained transport node ID (S33).

The virtual router control server 24 obtains a source transport node ID and an LSP value from an entry whose terminate transport node ID matches the obtained transport node ID (S34).

The virtual router control server 24 generates a new registration entry in the routing information table 45 of the transport node that is the start point of the logical path (S35). The new registration entry of the routing information table 45 holds a transmission LSP, a network address to which a router connected to the transport node 20-*x* which is the destination of the transmission LSP belongs, and a network address in an IP network beyond the router. The network address to which a router connected to the transport node 20-*x* belongs and the network address in the IP network beyond the router are network address information stored in the LSA packet that has been transmitted from the newly connected router 11-2.

The virtual router control server 24 lastly notifies the new routing information entry to some of the transport nodes 20-1 to 20-*n* in which LSPs having the transport node 20-2 as the end point are set (S36).

The completion of Steps S30 to S36 described above concludes the flow of processing executed by the virtual router control server 24 in response to the reception of an LSA packet (S37).

After finishing the series of path calculation processing steps, the virtual router control server 24 generates and transmits an LSAck packet to the router 11-2, which is the sender of the LSA packet. The LSAck packet is transferred to the router 11-2 via the controller unit 33 and IP-IF card 21 of the transport node 20-2 (S23).

The transport node 20-1 is notified of the new routing information entry by the virtual router control server 24, and registers the network address obtained from the virtual router control server 24 in the network address field of an entry of the routing information table 45 that holds the transmission LSP 10. The contents of the routing information table 45 in which the new entry has been registered are updated from data of S41 of FIG. 10A to data of S42 of FIG. 10B. The transport node 20-1 further notifies the update made to its own routing information table 45 to the router 11-1, which is connected to the transport node 20-1, by generating an LSA packet and transmitting the LSA packet to the router 11-1 (S22). Information that is contained in the LSA packet transmitted to the router 11-1 is the newly registered network address, "BB".

A new router is connected to the data transport system through the processing described above. The processing also enables the data transport system to notify a new addition of logical paths to routers that have already been connected to the data transport system. The data transport system according to this embodiment can thus control the transport network 22 like one huge virtual router.

Figure 2:
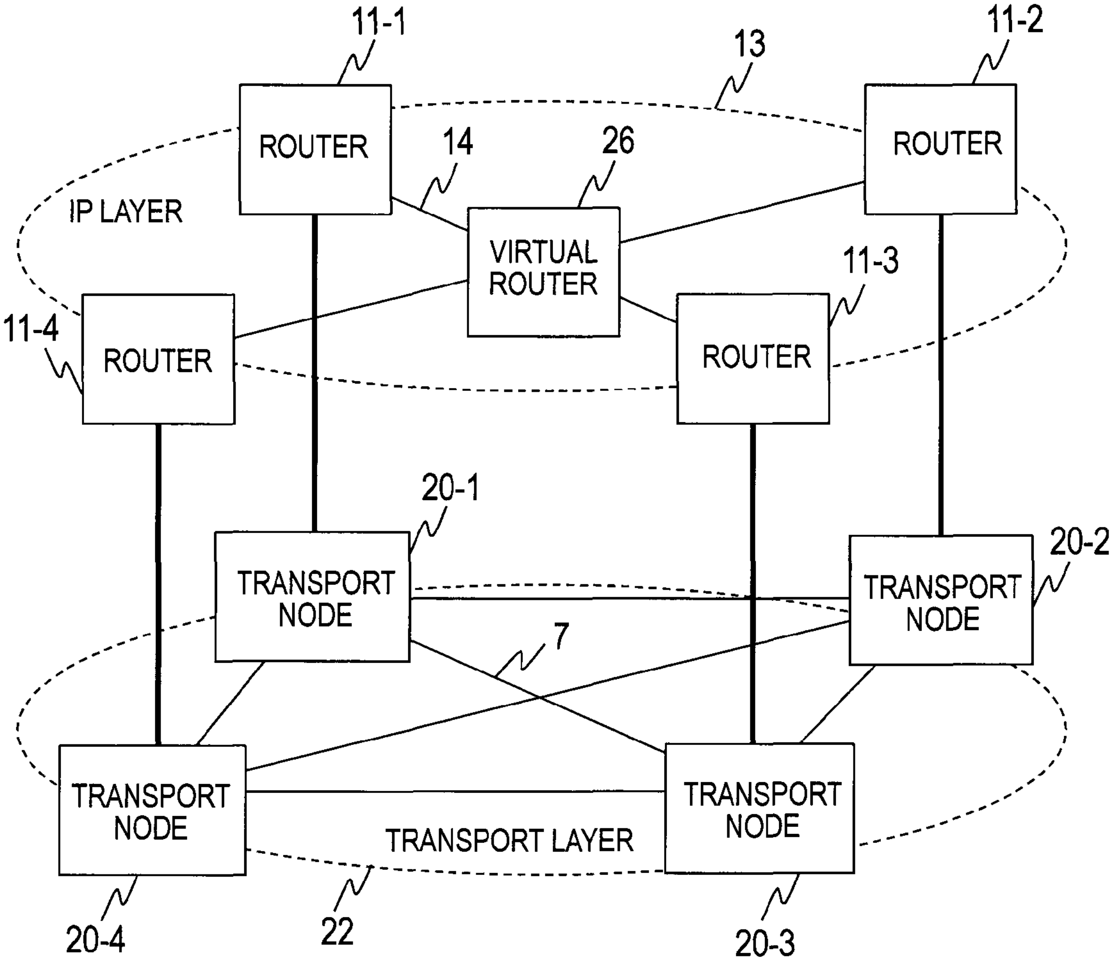
FIG. 2 is a diagram illustrating connection relations that are formed in the transport layer and the IP layer when routers are connected to the data transport system according to the first embodiment.

FIG. 2 is a diagram illustrating connection relations that are formed in the transport layer and the IP layer when routers are connected to the data transport system according to the first embodiment.

Connection relations in a transport layer 22 are as in conventional transport networks, and the logical paths 7 are set to constitute a full-mesh topology in the transport layer 22. An IP layer 13, on the other hand, has connection relations in which the routers 11-1 to 11-*n* are each seemingly connected point-to-point to a virtual router 26 because the data transport system operates as one huge virtual router.

Figure 3:
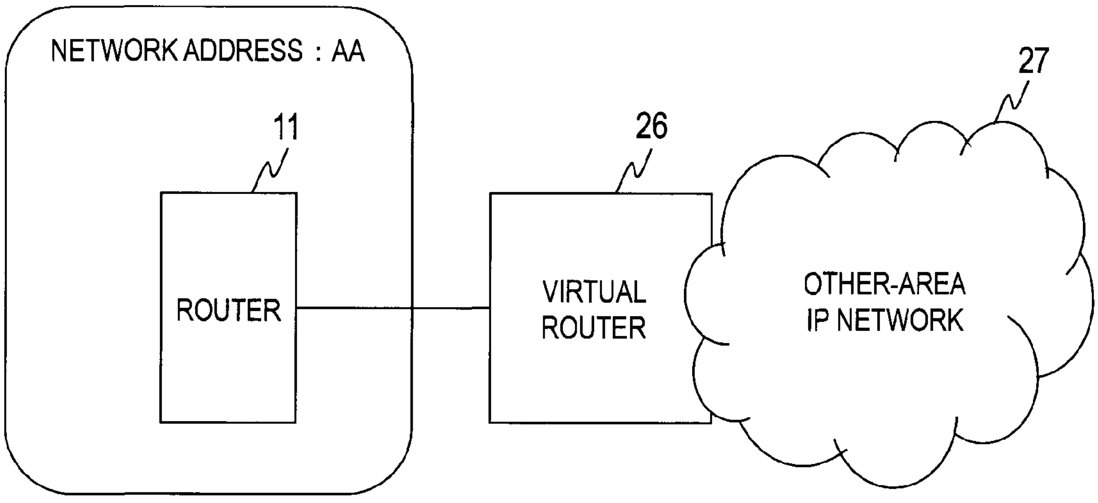
FIG. 3 is a diagram illustrating a connection relation of each router with a virtual router and another-area IP network.

Setting the virtual router and the bases of the transport network user as separate areas further reduces connection relations to be managed by each of the routers 11-1 to 11-*n*, leaving only the router 11 itself, a network within the base of the router 11, and the virtual router 26 as illustrated in FIG. 3. To the router 11, the rest of the routers 11-1 to 11-*n* connected to one another via the transport network 22 which are located in other bases appear as another-area IP network 27. The router 11 therefore needs to hold only network address list information, which tells to which network address data can be transferred by transferring an IP packet to the virtual router 26. This eliminates the need to manage the connection state between the routers 11-1 to 11-*n* connected to one another beyond the transport network, and thus makes the path calculation load lighter than that in the related art.

The data transport system of this embodiment can also lessen the processing load on the virtual router control server 24 by executing the processing of Hello packets, which are transmitted periodically from the routers 11-1 to 11-*n*, in the IP-IF cards 21 distributed throughout the data transport system. The processing load on the virtual router control server 24 can be lessened further by executing the processing of LSR packets, which are periodically transmitted from the routers 11-1 to 11-*n* as well, and the processing of transmitting an LSA packet, which needs to be generated each time the network configuration changes, in the IP-IF cards 21 distributed throughout the data transport system.

Conventional routers deduce connection relations of a network based on routing information that is collected from respective routers by exchanging routing protocols between routers that belong to the same area. The processing of calculating the network connection relations has been a factor that restricts scalability in the router networks. In contrast, the data transport system of this embodiment allows the virtual router control server 24 to keep track of connection relations of the transport nodes 20-1 to 20-*n* by collecting the connection relations from the transport network logical path DB 5, which means that the connection relation calculation load of conventional routers is not generated. The data transport system of this embodiment therefore has excellent scalability.

Processing of dealing with a failure that occurs in the data transport system according to this embodiment is described next by giving separate descriptions on processing operations for the following cases (1) to (3):

(1) A failure in a logical path of a transport network (2) A failure in a link connecting a transport node and a router (3) A failure in the virtual router control server, or a failure between one of the transport nodes and the virtual router control server The premise of the descriptions is that the transport network 22 has the configuration of FIG. 1. Specifically, there are four transport nodes 20-1 to 20-4 in the data transport system, and full-mesh logical paths are set between the transport nodes 20-1 to 20-4 in advance. One router is connected to each of the transport nodes 20-1 to 20-4. The following description on processing of dealing with a failure focuses on the transport nodes 20-1 and 20-2.

(1) Failure in a Logical Path of the Transport Network

Processing that is executed when a failure occurs in a logical path between the transport nodes 20-1 and 20-2 is described with reference to FIGS. 11, 12A, and 12B.

Figure 11:
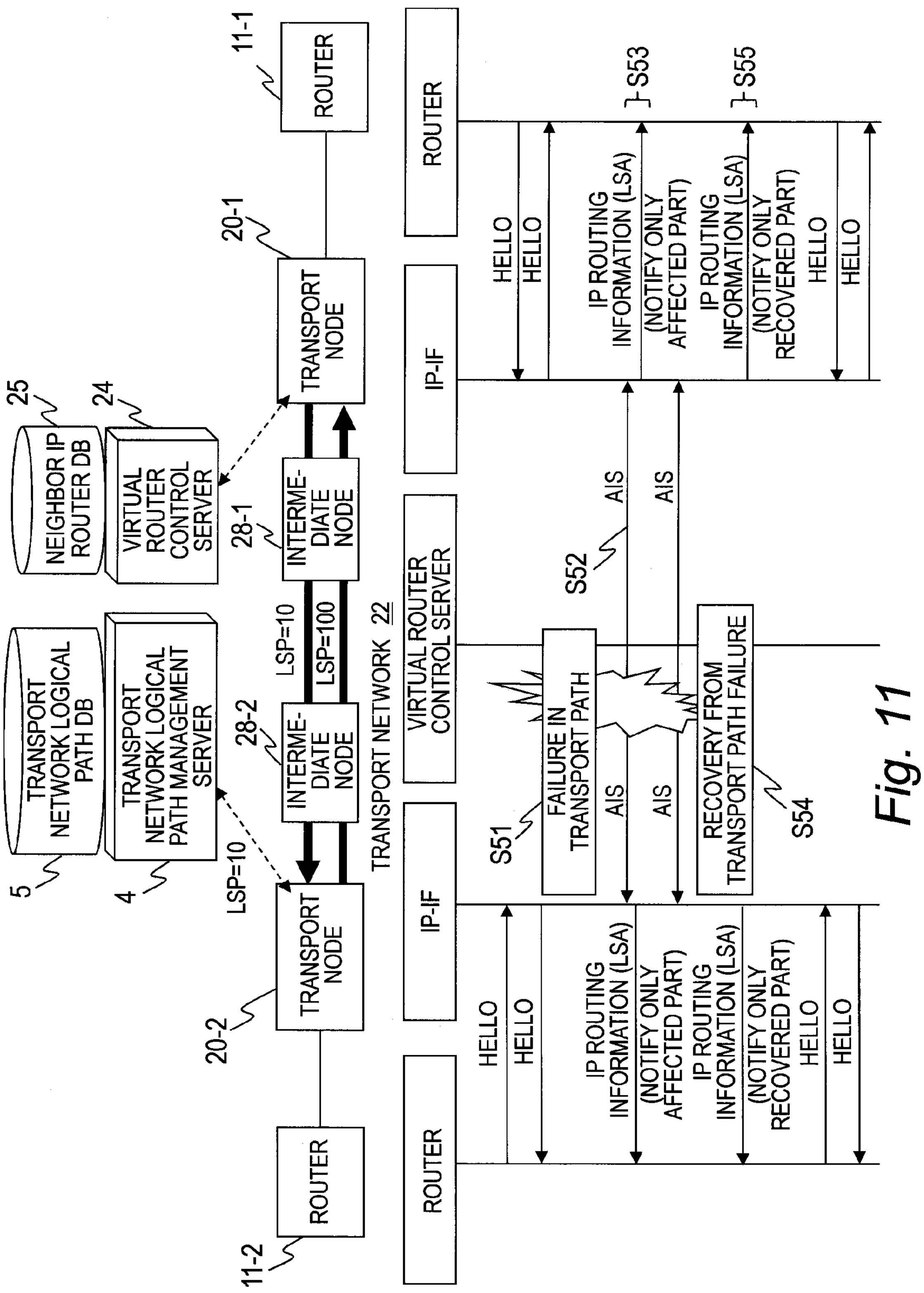
FIG. 11 is a diagram illustrating a processing sequence for dealing with a failure that occurs between the transport nodes of a transport network, and the resultant connection relations of the transport network.

FIG. 11 is a diagram illustrating a processing sequence for dealing with a failure that occurs between the transport nodes 20-1 and 20-2 of the transport network 22, and the resultant connection relations of the transport network 22. The transport network 22 includes the transport nodes 20-1 and 20-2 and intermediate nodes 28-1 and 28-2, which relay logical paths between the transport nodes. The LSP 10 is set as a logical path from the transport node 20-1 to the transport node 20-2, and the LSP 100 is set as a logical path from the transport node 20-2 to the transport node 20-1.

A processing sequence of the data transport system according to this embodiment is explained here taking as an example the case where a failure occurs between the intermediate nodes 28-1 and 28-2, which are interposed between the transport node 20-1 and the transport node 20-2, thereby breaking communication between the transport node 20-1 and the transport node 20-2.

A failure occurs between the intermediate nodes 28-1 and 28-2 (S51).

Detecting the failure, the intermediate nodes transmit to LSPs whose communication is affected by the failure an Alarm Indication Signal (AIS) frame or a Link Down Indication (LDI) frame to notify the LSPs of the logical path failure (S52). The AIS frame or the LDI frame is transmitted cyclically until the logical path recovers from the failure. Whichever of the AIS frame and the LDI frame is detected, the transport node 20-1 executes the same processing. The following description therefore takes as an example the case where the AIS frame is received.

The AIS frame transmitted from the intermediate nodes is terminated by the OAM processing unit 48 of the IP-IF card 21 of the transport node 20-1. Detecting the AIS frame, the OAM processing unit 48 writes "AIS detected" as the LPS state in an entry 91 of the routing information table 45, in which the LSP where the AIS frame has been detected is registered. The OAM processing unit 48 detects an LOC in some cases (S62 of FIG. 12B). When an LOC is detected, the OAM processing unit 48 writes "LOC detected" as the LSP state.

The logical path of the entry where the AIS has been detected cannot transmit/receive data normally. It is therefore necessary to notify the router 11-1, which uses this path, of the loss of the path.

The routing protocol processing unit 58 periodically polls the routing information table 45 and, when detecting a network address for which some alarm state is registered as the LSP state, generates an LSA packet for notifying the loss of the path and transmits the LSA packet to the router 11-1 (S53).

The router 11-1 receives the LSA packet to understand that transferring toward the transport network 22 a packet addressed to the router 11-2 does not deliver the packet to the destination, and accordingly calculates other routes.

Thereafter, the path recovers from the failure between the intermediate nodes 28-1 and 28-2 (S54). The intermediate nodes detect the recovery from the failure, and stop transmitting the AIS frame.

The OAM processing unit 48 of the transport node 20-1 determines that the logical path between the transport nodes 20-1 and 20-2 has recovered when the AIS frame has not been received for a given length of time, and writes "normal" as the LSP state of the entry 91 of the routing information table 45 in which the LSP where the AIS frame is no longer detected is registered (S61 of FIG. 12A).

Now that the logical path has recovered, the router 11-1 which uses this logical path needs to be notified of the generation of a path. The routing protocol processing unit 58 periodically polls the routing information table 45 and, when detecting a network address for which the LPS state has been changed to "normal", generates an LSA packet for notifying that a path has been generated, and transmits the LSA packet to the router 11-1 (S55).

The router 11-1 receives the LSA packet to understand that a packet addressed to the router 11-2 can now be transferred toward the transport network 22, and executes path recalculation.

This processing does not change data in entries of the transport network logical path DB 5 and the neighbor IP router DB 25.

The description given above takes the detection of an AIS as an example. Other forms of alarm for a failure in the transport network include LDI and LOC, and the processing sequence that takes place when an LDI or an LOC is detected is the same as when an AIS is detected.

This processing is executed only between the transport nodes 20-1 and 20-2 which are affected by the communication failure, and therefore does not require path recalculation in all routers that are connected to the transport network, unlike the related art. The path calculation load on the routers is accordingly light.

Moreover, this processing does not generate load on the virtual router control server 24.

The data transport system according to this embodiment thus avoids a situation where the load concentrates in one part of the system, and can therefore provide a large-scale router connecting transport network. In addition, the data transport system can continue to provide a communication service despite a failure in the data transport system.

(2) Failure in a Link Connecting a Transport Node and a Router

Processing that is executed when a failure occurs in a link connecting the transport node 20-2 and the router 11-2 to each other is described with reference to FIGS. 13, 14A, and 14B.

Figure 13:
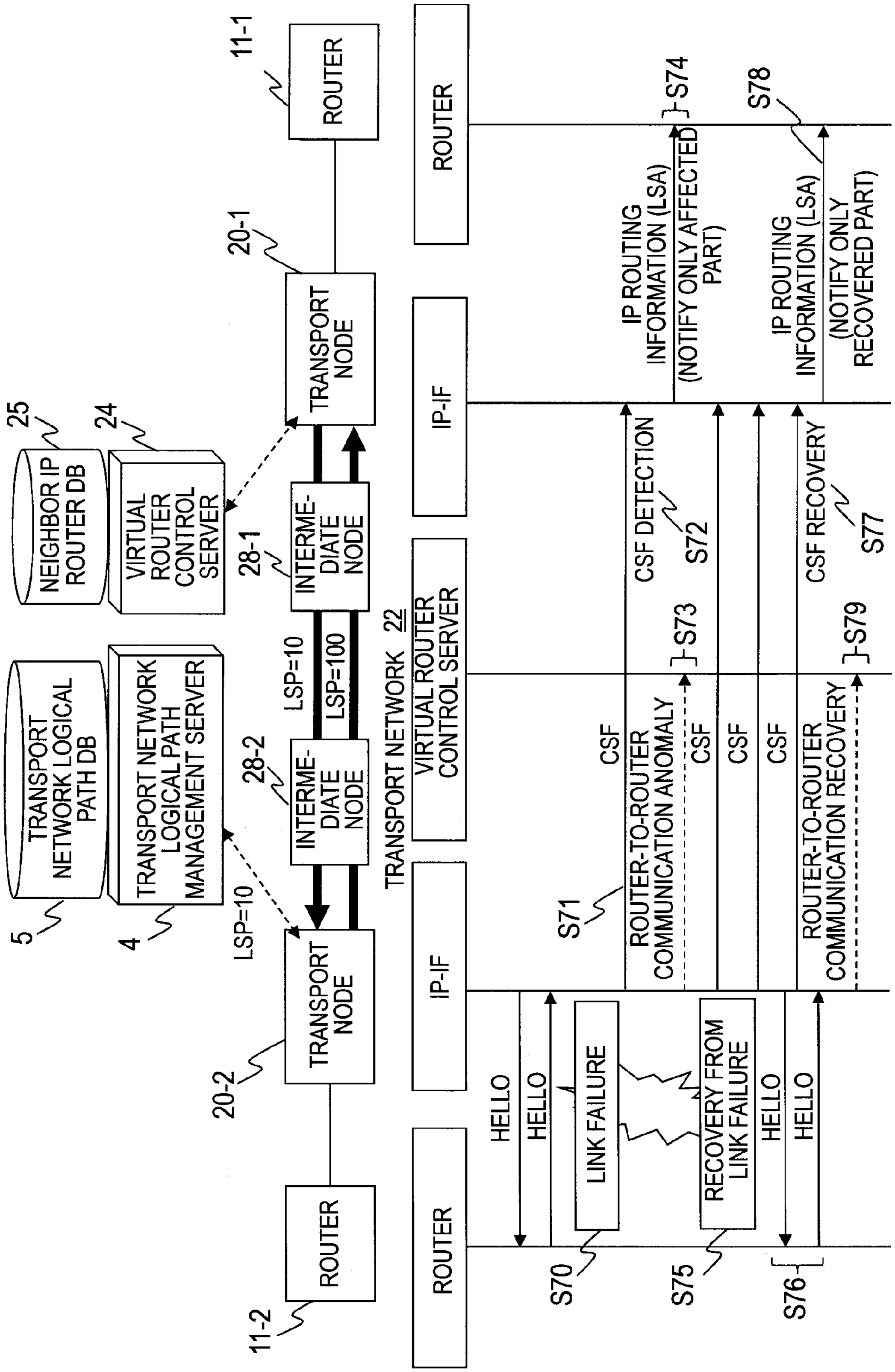
FIG. 13 is a diagram illustrating a processing sequence for dealing with a failure that occurs between the transport node 20-2 and the router 11-2, and the resultant connection relations of the transport network.

FIG. 13 is a diagram illustrating a processing sequence for dealing with a failure that occurs between the transport node 20-2 and the router 11-2, and the resultant connection relations of the transport network 22. A processing sequence of the data transport system according to this embodiment is described here taking as an example the case where a failure occurs in a link between the transport node 20-2 and the router 11-2.

A link failure occurs between the transport node 20-2 and the router 11-2 (S70). A failure in a link can be detected by the reception circuit 41 of the IP-IF card 21 of the relevant transport node based on the disruption of input signals. A link failure can also be detected by detecting that Hello packets which are exchanged cyclically with the connected router have not been received for a given length of time.

Detecting the link failure, the transport node 20-2 transmits a CSF frame from the OAM processing unit 48 of the IP-IF card 21. The CSF frame is transmitted cyclically to every transmission LSP 62 registered in the routing information table 45 while the failure lasts (S71).

The connection between the transport node 20-2 and the router 11-2 is broken by this failure, and the transport node 20-2 therefore notifies the virtual router control server 24 of the fact that a communication anomaly has occurred between routers (S73). Notified of this, the virtual router control server 24 writes "failure" as the state 84 in an entry of the neighbor IP router DB 25 in which the relevant router is registered.

The CSF frame is detected by the OAM processing unit 48 of the IP-IF card 21 of the transport node 20-1 (S72). Detecting the CSF frame, the OAM processing unit 48 writes "CSF detected" as the LSP state in an entry 92 of the routing information table 45 in which the LSP where the CSF frame has been detected is registered (S82 of FIG. 14B).

The logical path of the entry where the CSF frame has been detected is normal but data cannot be transmitted to/received from the router that is connected beyond the logical path. It is therefore necessary to notify the router 11-1, which uses this path, of the loss of the path.

The routing protocol processing unit 58 periodically polls the routing information table 45 and, when detecting a network address for which some alarm state is registered as the LSP state, generates an LSA packet for notifying the loss of the path and transmits the LSA packet to the router 11-1 (S74).

The router 11-1 receives the LSA packet to understand that transferring toward the transport network 22 a packet addressed to the router 11-2 does not deliver the packet to the destination, and accordingly calculates other routes.

Thereafter, the link between the transport node 20-2 and the router 11-2 recovers from the failure (S75). The transport node 20-2 continues to transmit the CSF frame despite the recovery of the link between the transport node 20-2 and the router 11-2, because main signals cannot be transmitted/received until a Hello packet is received from the neighbor router.

When the router 11-2 returns a Hello packet in response to a Hello packet from the transport node 20-2 after the recovery from the link failure, the OAM processing unit 48 of the IP-IF card 21 of the transport node 20-2 stops transmitting the CSF frame (S76).

The OAM processing unit 48 of the transport node 20-1 determines that the logical path between the transport node 20-2 and the router 11-2 has recovered when the CSF frame has not been received for a given length of time (S77).

The OAM processing unit 48 of the transport node 20-1 writes "normal" as the LSP state in the entry 91 of the routing information table 45 in which the LSP where the CSF frame is no longer detected is registered (S81 of FIG. 14A).

Now that the logical path has recovered, the router 11-1 which uses this logical path needs to be notified of the recovery of the path. The routing protocol processing unit 58 periodically polls the routing information table 45 and, when detecting a network address for which the LPS state has been changed to "normal", generates an LSA packet for notifying that the path has recovered, and transmits the LSA packet to the router 11-1 (S78).

The transport node 20-2 notifies the virtual router control server 24 of the fact that the router-to-router communication has recovered from the anomaly (S79). Notified of the recovery of communication, the virtual router control server 24 writes "normal" as the state 84 in the entry of the neighbor IP router DB 25 in which the relevant router is registered.

The router 11-1 receives the LSA packet to understand that a packet addressed to the router 11-2 can now be transferred toward the transport network 22, and executes path recalculation.

This processing does not change data in entries of the transport network logical path DB 5.

This processing is executed only between the transport nodes 20-2 and 20-1 which are affected by the communication failure, and therefore does not require path recalculation in all routers that are connected to the transport network, unlike the related art. The path calculation load on the routers is accordingly light. Moreover, this processing does not generate load on the virtual router control server 24.

The data transport system according to this embodiment thus avoids a situation where the load concentrates in one part of the system, and can therefore provide a large-scale router connecting transport network. In addition, the data transport system can continue to provide a communication service despite a failure in the data transport system.

(3) Failure in the Virtual Router Control Server, or a Failure Between One of the Transport Nodes and the Virtual Router Control Server Processing that is executed when a failure occurs in the virtual router control server 24, or when a failure occurs in a transport path between one of the transport nodes 20-1 to **20-*n* and the virtual router control server 24, is described with reference to FIG. 15. The premise of the description given here is that the IP-IF cards 21** process Hello packets and LSR packets.

Figure 15:
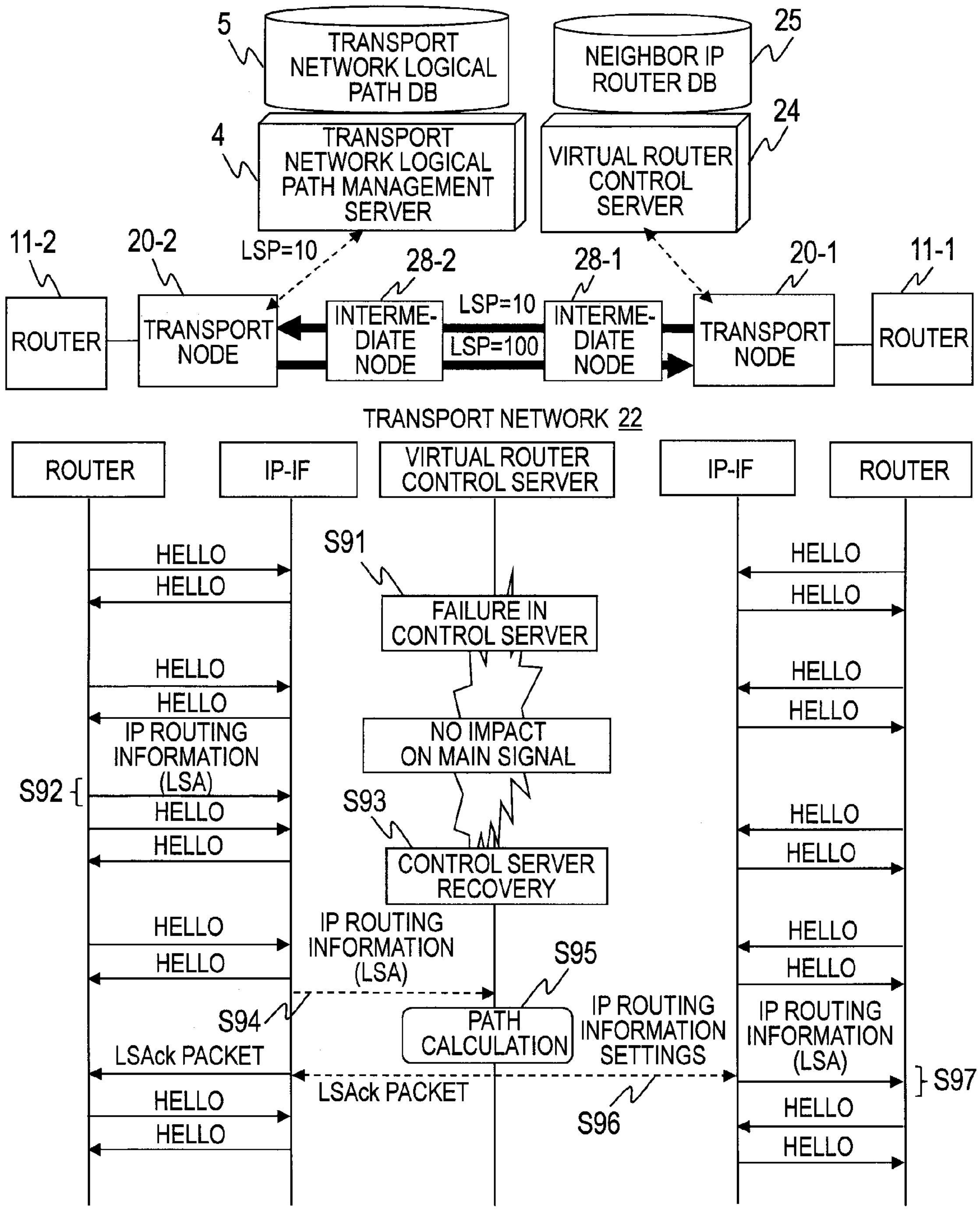
FIG. 15 is a diagram illustrating a processing sequence for dealing with a failure in the virtual router control server, or a failure that occurs in a transmission path between one transport node and the virtual router control server.

FIG. 15 is a diagram illustrating a processing sequence for dealing with a failure in the virtual router control server 24, or a failure that occurs in a transport path between one of the transport nodes 20-1 to **20-*n* and the virtual router control server 24**.

A processing sequence of the data transport system according to this embodiment is explained here taking as an example the case where a failure occurs in the virtual router control server 24.

A failure occurs in the virtual router control server 24 (S91).

Even when there is a failure in the virtual router control server 24, main signals are not affected because the IP-IF cards 21 of the transport nodes 20-1 to **20-*n* can process the transmission/reception of Hello packets, which are periodically exchanged between the transport nodes 20-1 to 20-*n* and the neighbor routers 11-1 to 11-*n***, and the transmission of an LSA packet in response to the reception of an LSR packet for requesting routing information.

When an LSA packet is received from one of the neighbor routers 11-1 to **11-*n*, on the other hand, an update of the routing information table 45 is necessary in the IP-IF card 21 of every transport node among the transport nodes 20-1 to 20-*n* that forms an LSP with one of the transport nodes 20-1 to 20-*n* that is the recipient of the LSA packet. However, connection relations of the transport network 22 need to be obtained by the virtual router control server 24 from the transport network logical path DB 5. The transport node 20-2 which has received an LSA packet at the time the failure has occurred therefore keeps the LSA packet in itself until the virtual router control server 24** recovers from the failure (S92).

Thereafter, the virtual router control server 24 recovers from the failure (S93).

Detecting the recovery of the virtual router control server 24, the transport node 20-2 transfers to the virtual router control server 24 the LSA packet that has been kept in the transport node 20-2 (S94).

A recovery of the virtual router control server 24 can be detected by, for example, executing the periodical exchange of health check packets between the virtual router control server 24 and each transport node.

Processing steps that follow the reception of the LSA packet by the virtual router control server 24 (S95, S96, and S97) are the same as S20 and the subsequent processing steps described with reference to FIG. 8.

As has been described, the data transport system according to this embodiment can continue to provide a communication service despite a failure that occurs in the virtual router control server 24 while in operation.

Second Embodiment

A second embodiment of this invention is described below with reference to the drawings. The difference in configuration of the second embodiment from the first embodiment is what contents are held in an entry of the routing information table 45 of the IP-IF card 21 which is provided in each of the transport nodes 20-1 to **20-*n***.

Settings of logical paths in the transport network 22 according to the second embodiment are described first with reference to FIGS. 1 and 16.

Logical paths set in the transport network 22 to and from the transport node 20-1 are the transmission LSP 10 and the reception LSP 100, which are formed with the transport node 20-2, the transmission LSP 20 and the reception LSP 200, which are formed with the transport node 20-3, and the transmission LSP 30 and the reception LSP 300, which are formed with the transport node 20-4.

FIG. 16 is a diagram illustrating an example of the contents of an entry in the routing information table 45 of the transport node 20-1 according to the second embodiment. The routing information table 45 in the second embodiment holds in each entry the network address 61, an active transmission LSP 62, an active reception LSP 63, an active LSP state 64, an auxiliary transmission LSP 65, an auxiliary reception LSP 66, and an auxiliary LSP state 67.

The transport network logical path management server 4 of the second embodiment registers, in the routing information table 45 of the transport node 20-1, in addition to a transmission LSP and a reception LSP that constitute an active logical path to be used when the transport network 22 is in a normal state, a transmission LSP and a reception LSP that constitute an auxiliary logical path to be used when some kind of failure occurs in the active logical path. The transport node to which the transport node 20-1 is connected when the active logical path is used and the transport node to which the transport node 20-1 is connected when the auxiliary logical path is used are physically different transport nodes selected out of the transport nodes 20-1 to **20-*n***.

To give a concrete example, in the first entry of the routing information table 45 of the transport node 20-1, the transmission LSP 10 and the reception LSP 100 which constitute a logical path to and from the transport node 20-2 are registered as the active logical path, and the transmission LSP 20 and the reception LSP 200 which constitute a logical path to and from the transport node 20-3 are registered as the auxiliary logical path.

An initial sequence that is executed when a router is connected to this data transport system is described next with reference to FIG. 8.

The specifics of the initial sequence are mostly the same as in the first embodiment, except for what contents are held in a new registration entry of the routing information table 45 of a transport node that is the start point of a logical path generated by the virtual router control server 24. In the second embodiment, the routing information table 45 is searched for an entry having as an active LSP an LSP that has a connection relation with one of the transport nodes 20-1 to 20-*n* that is connected to the router newly connected to the transport network 22, and a network address obtained from the newly connected router is registered in this entry.

For example, in the case where the router 11-2 is connected to the transport node 20-2 after the router 11-1 is registered, the network address "BB" is registered only in an entry of the routing information table 45 of the transport node 20-1 that has the LSP 10 as the active transmission LSP. An entry having the LSP 10 as the auxiliary transmission LSP is registered in the routing information table 45 of FIG. 16, but the network address "BR" is not registered in this entry.

Figure 17:
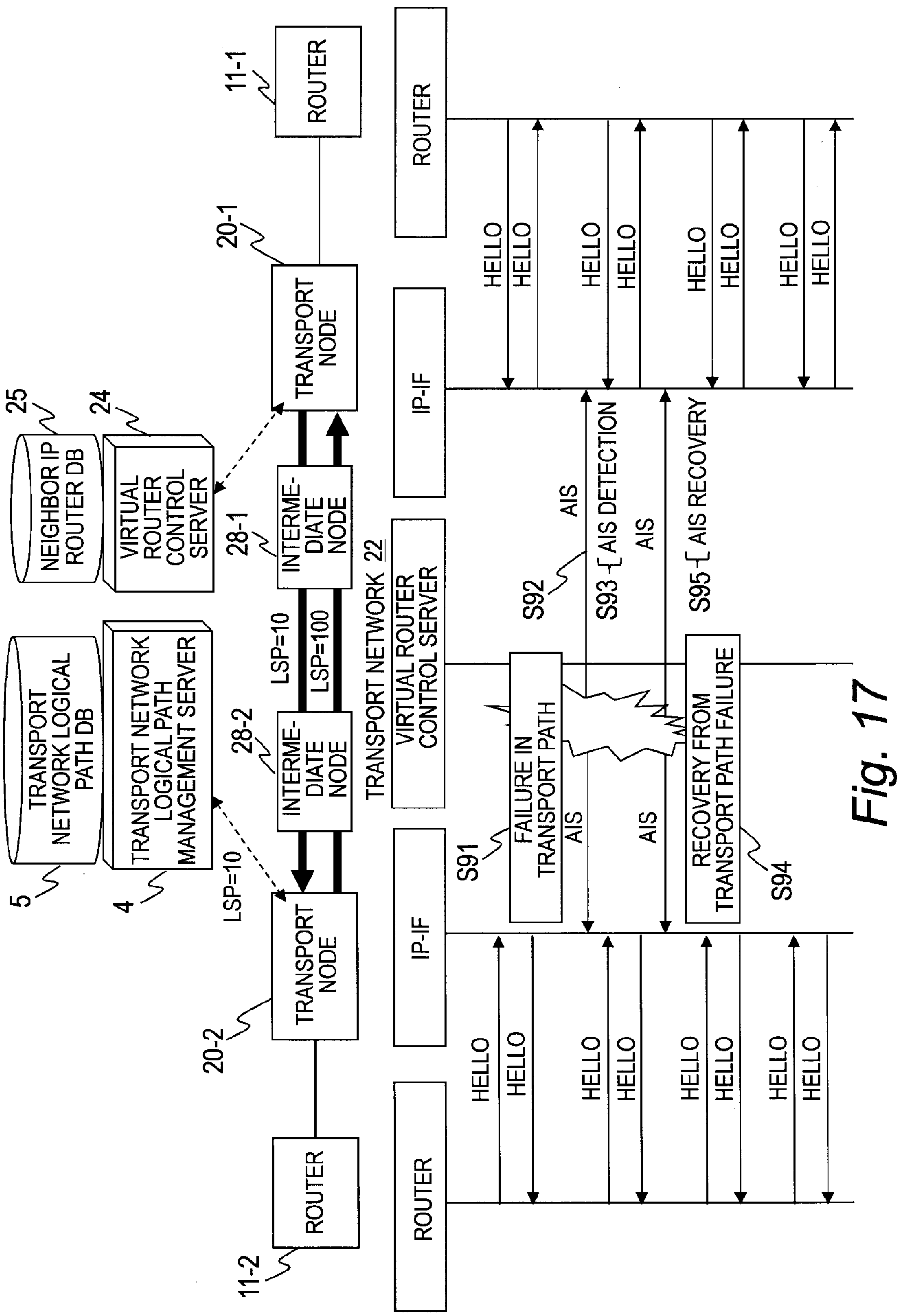
FIG. 17 is a diagram illustrating a processing sequence for dealing with a failure that occurs between transport nodes of a transport network in a data transport system according to the second embodiment, and the resultant connection relations of the transport network.

An operation sequence that is executed when a failure occurs in a logical path within the transport network 22 is described next with reference to FIG. 17. FIG. 17 is a diagram illustrating a processing sequence for dealing with a failure that occurs between the transport node 20-1 and the transport node 20-2 of the transport network 22, and the resultant connection relations of the transport network 22. The transport network 22 includes the transport nodes 20-1 and 20-2, and intermediate nodes 28-1 and 28-2, which relay logical paths between the transport nodes. The LSP 10 is set as a logical path from the transport node 20-1 to the transport node 20-2, and the LSP 100 is set as a logical path from the transport node 20-2 to the transport node 20-1.

A processing sequence of the data transport system according to this embodiment is explained here taking as an example the case where a failure occurs between the intermediate nodes 28-1 and 28-2, which are interposed between the transport node 20-1 and the transport node 20-2, thereby breaking communication between the transport node 20-1 and the transport node 20-2.

A failure occurs between the intermediate nodes 28-1 and 28-2 (S91).

Detecting the failure, the intermediate nodes transmit to LSPs whose communication is affected by the failure an Alarm Indication Signal (AIS) frame or a Link Down Indication (LDI) frame to notify the LSPs of the logical path failure (S92). The AIS frame or the LDI frame is transmitted cyclically until the logical path recovers from the failure. Whichever of the AIS frame and the LDI frame is detected, the transport node 20-1 executes the same processing. The following description therefore takes as an example the case where the AIS frame is received.

The AIS frame transmitted from the intermediate nodes is terminated by the OAM processing unit 48 of the IP-IF card 21 of the transport node 20-1 (S93).

Detecting the AIS frame, the OAM processing unit 48 writes "AIS detected" as the active LSP state in an entry of the routing information table 45 in which the LSP where the AIS frame has been detected is registered. The OAM processing unit 48 detects an LOC in some cases. When an LOC is detected, the OAM processing unit 48 sets "LOC detected" as the active LSP state.

The active logical path of the entry where the AIS has been detected cannot transmit/receive data normally. Therefore, in the case where a state indicating a failure in the transport network ("AIS detected"/"LDI detected"/LOC detected) is registered as the LSP state of the active logical path, the MPLS-TP encapsulation unit 44, which encapsulates a received IP packet in an MPLS frame, switches the transmission LSP to be used for data transfer from the active LSP to the auxiliary LSP.

By this switch to the auxiliary LSP, an IP packet having the network address "BB" which has been transferred from the transport node 20-1 to the transport node 20-2 before the switch to the auxiliary LSP is transferred to the transport node 20-3.

The router 11-3 which has the network address "CC" is connected to the transport node 20-3. When the router 11-3 receives an IP packet that the router 11-1 has transmitted to the router 11-2, the router 11-3 re-transmits the received IP packet to the transport node 20-3. This is because it is registered in the router 11-3 that the network address "BB" can be reached over the transport network 22.

Receiving the IP packet addressed to the network address "BB", the transport node 20-3 encapsulates the received packet in an MPLS frame and transfers the received packet to the transport node 20-2.

The transport node 20-2 transfers the received IP packet to the router 11-2, which belongs to the network address "BB".

In the second embodiment, when a failure occurs in a logical path in the transport network 22, switching which one of the transport nodes 20-1 to 20-*n* is used to transfer an IP packet thus prevents the failure in the transport network 22 from affecting the routers 11-1 to 11-*n* connected to the transport network 22.

When the transport network 22 recovers from the failure (S94) and the AIS that has been detected in the transport node 20-1 is no longer detected, the MPLS-TP encapsulation unit 44, which encapsulates a received IP packet in an MPLS frame, switches the transmission LSP to be used for data transfer from the auxiliary LSP to the active LSP (S95).

According to the second embodiment, when a logical path failure occurs in the transport network 22, communication can thus be continued without requiring the routers 11-1 to 11-*n*, which are connected to the transport network 22, to recalculate paths.

Third Embodiment

A third embodiment of this invention is described below with reference to the drawings. The difference in configuration of the third embodiment from the first embodiment is that routers have IP-IF cards and that the IP-IF cards of the routers are included as subjects of monitoring by a transport network logical path management server and a virtual router control server.

A connection configuration of the data transport system and a configuration of routers according to the third embodiment are described with reference to FIGS. 18 and 19.

Figure 18:
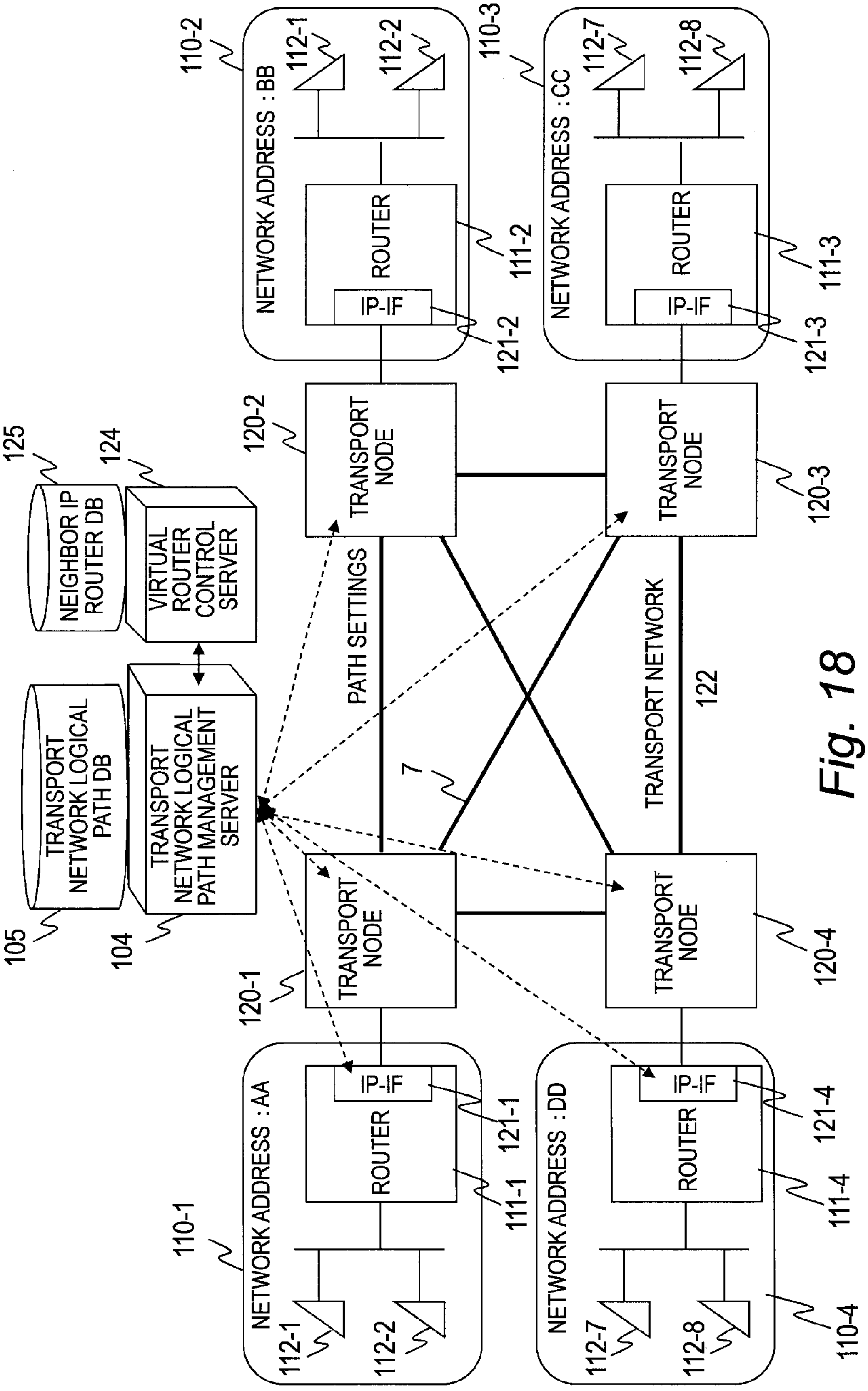
FIG. 18 is a diagram illustrating physical connections of a data transport system according to a third embodiment of this invention.
Figure 19:
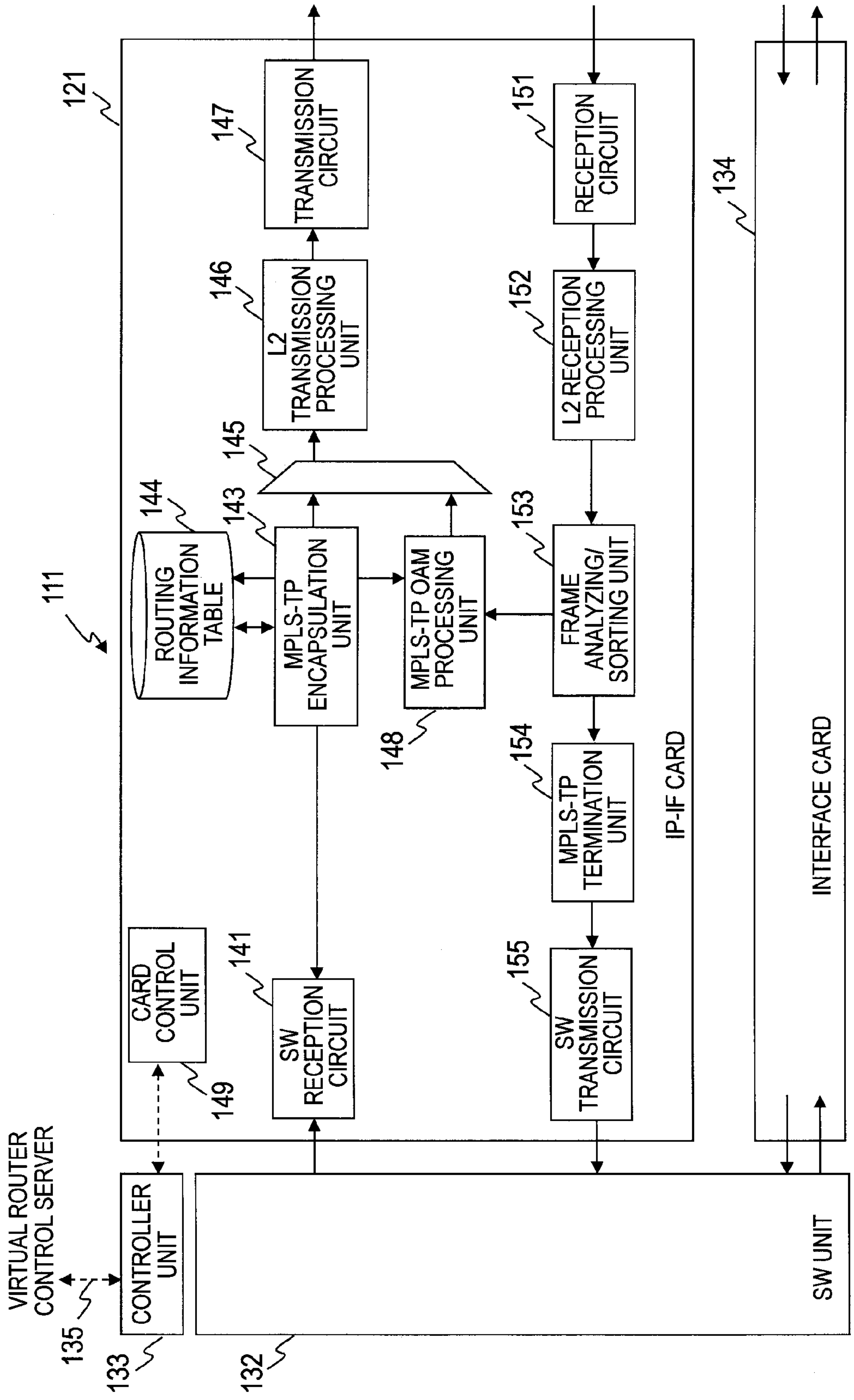
FIG. 19 is a diagram illustrating the configuration of a router in which an IP-IF card is mounted according to the third embodiment.
Figure 20:
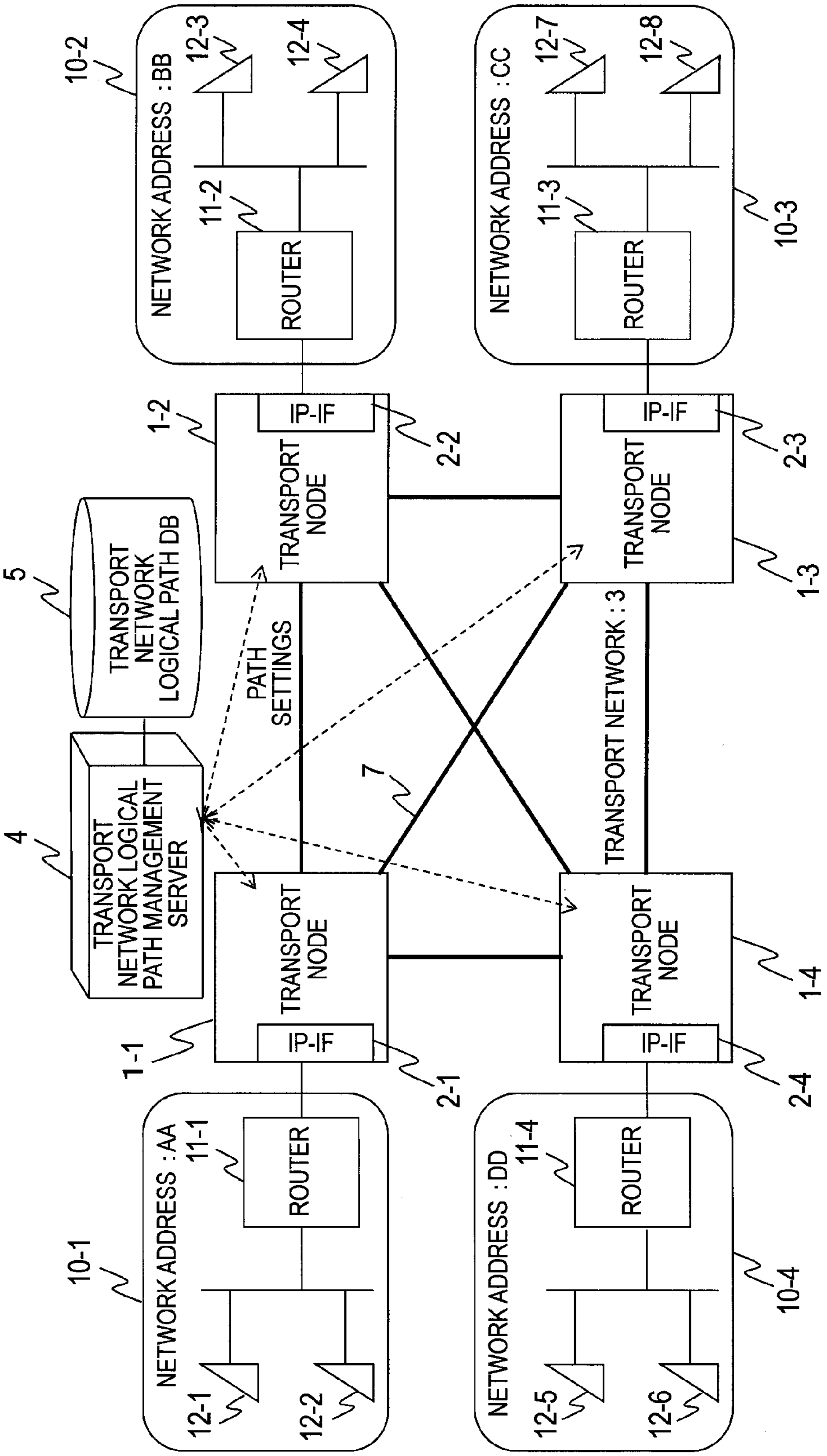
FIG. 20 is a diagram illustrating an example of a related transport network provided by a telecommunication carrier and connection relations that are formed to connect bases of a transport network user to one another.
Figure 21:
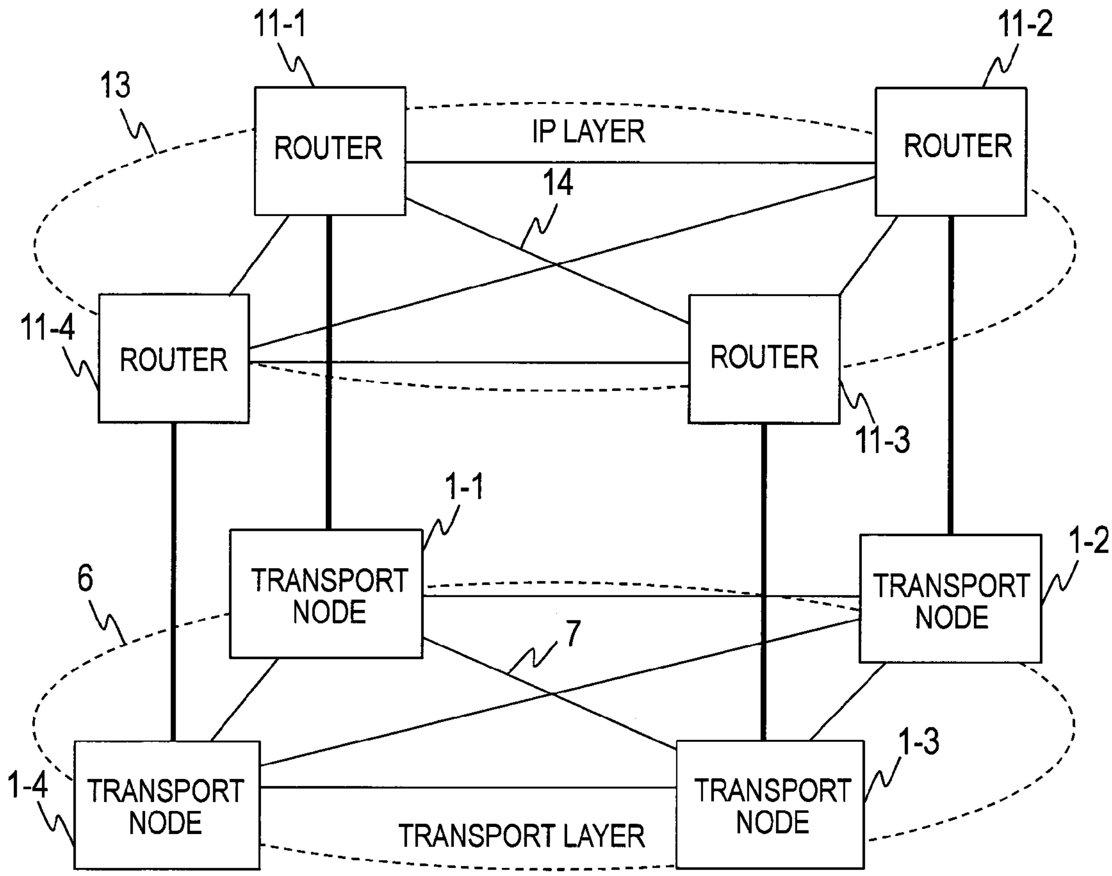
FIG. 21 is a diagram illustrating related connection modes of the transport layer and of the IP layer.

FIG. 18 is a diagram illustrating physical connections of the data transport system according to the third embodiment. In the data transport system according to the third embodiment, a telecommunication carrier provides a transport network 122 and a transport network user rents logical paths 7 of the transport network 122 from the telecommunication carrier. Four sites which are geographically distant from one another and which are denoted by 110-1 to 110-4 (bases 110-1 to 110-*n*, n is 4 in FIG. 18) are connected to one another via the transport network 122 of the telecommunication carrier.

The bases 110-1 to 110-*n* of the transport network user include routers 111 (111-1 to 111-*n*), which connect to the transport nodes 120 (120-1 to 120-*n*), and include communication terminals 112 (112-1 to 112-*m*). The routers 111-1 to 111-*n* which connect to the transport nodes 120-1 to 120-*n* have IP-IF cards 121 (121-1 to 121-*n*). The communication terminals 112-1 to 112-*m* are, for example, routers, personal computers, or similar information devices for connecting to other communication networks.

A network address is set to each of the bases of the transport network user. Usually, a network address is expressed in prefix notation, such as 192.168.1.0/24 in IPv4. Here, the network addresses of the respective bases are simplified as AA, BB, CC, and DD.

The data transport system of the telecommunication carrier includes the transport nodes 120 (120-1 to 120-*n*), a transport network logical path management server 104, and a virtual router control server 124. The transport network 122 is built from the plurality of transport nodes 120-1 to 120-*n*. The transport network logical path management server 104 and the virtual router control server 124 are separate servers in FIG. 18, but the same effect is obtained also when the functions of these servers are implemented in a single server.

In the first embodiment, the start points and end points of logical paths in the transport network 22 are IP-IF cards of transport nodes. In the third embodiment where the routers 111-1 to 111-*n* have IP-IF cards 121-1 to 121-*n*, the start points and end points of logical paths in the transport network 122 are IP-IF cards 121-1 to 121-*n* of the routers 111-1 to 111-*n*.

Accordingly, a transport network logical path DB 105, which is managed by the transport network logical path management server 104, holds as a path source transport node ID and a path terminate transport node ID the identifiers of the IP-IF card 121-*x* and the IP-IF card 121-*y* which are provided in the router 111-*x* and the router 111-*y*, respectively ($1 \le x \le n$, $1 \le y \le n$, $y \ne x$).

The configuration of the routers 111 is described next with reference to FIG. 19. FIG. 19 is a diagram illustrating the configuration of each of the routers 111 in which the IP-IF cards 121 are mounted according to the third embodiment. The router 111 includes at least one controller unit 133, a switch (SW) unit 132, at least one IF card 134, and at least one IP-IF card 121. The controller unit 133, the SW unit 132, the IF card 134, and the IP-IF card 121 are connected to one another. In the drawing, the solid arrows indicate the flow of main signals and the dashed arrows indicate the flow of control signals.

The controller unit 133 and the SW unit 132 have the same functions as those of the controller unit 33 and the SW unit 32 in the first embodiment, and a detailed description thereof is omitted.

The IP-IF card 121 includes a card control unit 149, a reception circuit 151, an L2 reception processing unit 152, a frame analyzing/sorting unit 153, an MPLS-TP termination unit 154, an SW transmission circuit 155, an SW reception circuit 141, an MPLS-TP encapsulation unit 143, a scheduler 145, an L2 transmission processing unit 146, a transmission circuit 147, an MPLS-TP OAM processing unit 148 (hereinafter, referred to as OAM processing unit 148), and a routing information table 144.

These function blocks except the card control unit 149 are the same as the reception circuit 41, the L2 reception processing unit 42, the MPLS-TP encapsulation unit 44, the routing information table 45, the SW transmission circuit 47, the OAM processing unit 48, the SW reception circuit 51, the MPLS-TP termination unit 53, the scheduler 54, the L2 transmission processing unit 55, and the transmission circuit 56, which are described in the first embodiment with reference to FIG. 4. A detailed description on the function blocks is therefore omitted.

In the third embodiment, where the IP-IF cards 121-1 to 121-*n* are incorporated in the routers 111-1 to 111-*n*, function blocks for transmitting/receiving a routing protocol are not provided. Information set in the routing information table 144 by the transport network logical path management server 104 and the virtual router control server 124 is the same as in the first embodiment.

The controller unit 133 and the card control unit 148 which differ from their counterparts in the first embodiment are described below.

The controller unit 133 includes a control IF 135 for connecting to the transport network logical path management server 104 and to the virtual router control server 124. The controller unit 33 receives settings information from the transport network logical path management server 104 and the virtual router control server 124, and sets the settings information in the SW unit 132, the IF card 134, and the IP-IF card 121. The controller unit 133 also executes processing of routing packets which the router receives from the IF card 134.

Each router 111 of the third embodiment are connected to the communication terminals 112 within its own base via the IF card 134 instead of the IP-IF card 121. The router 111 exchanges routing information with the communication terminals 112 based on a routing protocol. Each router 111 also has a routing processing function and, through path calculation processing, keeps track of router networks to which its own IF card 134 is connected.

On the other hand, the router 111 does not need to use a routing protocol to collect information on other routers connected to its own IP-IF card 121, which connects to the transport network 122, because network addresses are set by the virtual router control server 124.

As has been described, according to the third embodiment, effects equivalent to those of the first embodiment are obtained when IP-IF cards are provided on the router side.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

When an element (device or node) is referred to as being "connected to" or "connected with" another element, it can be directly connected to or with another element or intervening elements may be present. In contrast, when an element is referred to as being "directly connected to" or "directly connected with" another element, there are no intervening elements present.

What is claimed is:

1. A data transport system, comprising:

a plurality of transport nodes which are constituents of a transport network;

a logical path control server for establishing logical paths between a plurality of communication devices via the transport network, a transport network logical path management server for presetting the logical paths between the plurality of transport nodes and holding a logical path database for storing groups each consisting of a source transport node identifier, a destination transport node identifier and a logical path identifier of a logical path included in the preset logical paths between the plurality of transport nodes, wherein the logical paths are preset between the plurality of transport nodes, in a case where a network configuration of a communication network to which a first communication device of the plurality of communication devices belongs is changed, a first transport node connected with the first communication device transfers logical path control data sent from the first communication device to the logical path control server, the logical path control server, upon receiving the logical path control data, calculates a logical path between the first communication device and a second communication device of the plurality of communication devices via the transport network based on information about a connection relation between the first communication device and the first transport node determined based on the logical path control data, and on preset information about the logical paths between the plurality of transport nodes, the logical path control server sets the logical path between the first communication device and the second communication device to a transport node connected with the second communication device, each of the plurality of transport nodes holds a routing information table for storing information about correlations between network addresses notified from the logical path control server and logical path identifiers of the logical paths between the plurality of transport nodes, upon receiving the logical path control data, the logical path control server selects a logical path of which a given transport node is the first transport node which sent the logical path control data from the preset logical paths between the plurality of transport nodes based on the logical path database, the logical path control server registers a logical path identifier of the selected logical path and a network address included in the logical path control data in association with a routing information table of a transport node, which is a source transport node of the selected logical path, the source transport node of the selected logical path notifies the network address included in the logical path control data and registered in the routing information table to the second communication device connected with the source transport node, and the logical path control server sends a response data corresponding to the logical path control data, via the first transport node which transferred the logical path control data, to the first communication device which sent the logical path control data.

2. The data transport system according to claim 1, wherein, in a case where one of the plurality of transport nodes detects a communication failure which has occurred in one of the logical paths within the transport network, the one of the plurality of transport nodes notifies the communication failure to communication devices which communicate via the one of the logical paths suffering the communication failure.

3. The data transport system according to claim 1, wherein, in a case where the first transport node detects a communication failure which has occurred between the first transport node and the first communication device, the first transport node notifies the communication failure between the first transport node and the first communication device to other transport nodes via the transport network, and wherein the other transport nodes notified of the communication failure respectively notify the communication devices to which the other transport nodes are connected respectively of the communication failure between the first transport node and the first communication device.

4. The data transport system according to claim 1, wherein, in a case where the first transport node detects one of a failure in the logical path control server and a failure in a logical path between the logical path control server and the first transport node, the first transport node keeps the logical path control data transmitted from the first communication device during the one of the failures and transfers the kept logical path control data to the logical path control server after detecting recovery from the one of the failures.

5. The data transport system according to claim 1, wherein the transport network logical path management server defines as an active logical path a first logical path which leads from the first transport node to a second transport node of the plurality of transport nodes, and sets as an auxiliary logical path a second logical path which leads from the first transport node to a third transport node of the plurality of transport nodes, wherein, in a case where the first transport node detects a communication failure which has occurred in the first logical path, the first transport node transmits, to the third transport node via the auxiliary logical path, data that is to be transmitted to the second transport node, and wherein, the third transport node transmits the data received from the first transport node that is to be transmitted to the second transport node to the second transport node.

6. The data transport system according to claim 1, wherein the first transport node transfers, out of logical path control data received from the first communication device, a piece of logical path control data containing information about the connection relation with a newly connected first communication device to the logical path control server and processes other pieces of logical path control data.

7. The data transport system according to claim 1, wherein the plurality of transport nodes have IP interfaces for connecting respectively with the plurality of communication devices.

8. The data transport system according to claim 1, wherein the plurality of communication devices have IP interfaces for connecting respectively with the plurality of transport nodes.

9. The data transport system according to claim 1, wherein the logical path database stores information about the preset logical paths between the plurality of transport nodes, each of the plurality of transport nodes holds a routing information table for storing information about the logical paths between the plurality of transport nodes and logical path information of the communication network received from the logical path control server, and the logical path control server registers the logical path information of the communication network included in the logical path control data in association in a routing information table of a transport node, which is a source transport node of the selected logical path.

10. The data transport system according to claim 1, wherein the logical path control data includes a network address of the communication network to which the first communication device belongs and a network address of a communication network connected with the first communication device.

11. The data transport system according to claim 1, wherein each of the plurality of transport nodes creates routing information notification data including a network address stored in the routing information table based on the routing information table and transmits the routing information notification data to the communication device with which each of the plurality of transport nodes is connected in response to data requesting logical path information and received from the communication device with which each of the plurality of transport nodes is connected.

12. A control method of a data transport system comprising a plurality of transport nodes which are constituents of a transport network and a logical path control server for establishing logical paths between a plurality of communication devices via the transport network, the logical paths being preset between the plurality of transport nodes, the control method comprising:

transferring, by a first transport node connected with a first communication device of the plurality of communication devices, logical path control data sent from the first communication device to the logical path control server in a case where a network configuration of a communication network to which the first communication device of the plurality of communication devices belongs is changed;

calculating by the logical path control server upon receiving the logical path control data, a logical path between the first communication device and a second communication device of the plurality of communication devices via the transport network based on information about a connection relation between the first communication device and the first transport node determined based on the logical path control data, and on preset information about the logical paths between the plurality of transport nodes; and presetting the logical paths between the plurality of transport nodes, using a transport network logical path management server, and holding a logical path database for storing groups each consisting of a source transport node identifier, a destination transport node identifier and a logical path identifier of a logical path included in the preset logical paths between the plurality of transport nodes, wherein each of the plurality of transport nodes holds a routing information table for storing information about correlations between network addresses notified from the logical path control server and logical path identifiers of the logical paths between the plurality of transport nodes, upon receiving the logical path control data, the logical path control server selects a logical path of which a given transport node is the first transport node which sent the logical path control data from the preset logical paths between the plurality of transport nodes based on the logical path database, the logical path control server registers a logical path identifier of the selected logical path and a network address included in the logical path control data in association with a routing information table of a transport node, which is a source transport node of the selected logical path, the source transport node of the selected logical path notifies the network address included in the logical path control data and registered in the routing information table to the second communication device connected with the source transport node, and the logical path control server sends a response data corresponding to the logical path control data, via the first transport node which transferred the logical path control data, to the first communication device which sent the logical path control data.

13. The control method according to claim 12, wherein the routing information table stores information about the logical paths between the plurality of transport nodes and logical path information of the communication network received from the logical path control server, and the logical path control server registers the logical path information of the communication network included in the logical path control data in association in a routing information table of a transport node which is a source transport node of the selected logical path.

14. A logical path control server comprising:

a plurality of transport nodes which are constituents of a transport network that is connected to the logical path control server, and a transport network logical path management server for presetting the logical paths between the plurality of transport nodes and holding a logical path database for storing groups each consisting of a source transport node identifier, a destination transport node identifier and a logical path identifier of a logical path included in the preset logical paths between the plurality of transport nodes, wherein a plurality of communication devices communicate with one another through the logical paths via the transport network, in a case where a network configuration of a communication network to which a first communication device of the plurality of communication devices belongs is changed, the logical path control server receives logical path control data sent from the first communication device to the logical path control server, the logical path control server, upon receiving the logical path control data, calculates a logical path between the first communication device and a second communication device of the plurality of communication devices via the transport network based on information about a connection relation between the first communication device and a first transport node connected with the first communication device determined based on the logical path control data, and on preset information about the logical paths between the plurality of transport nodes, the logical path control server sets the logical path between the first communication device and the second communication device to a transport node connected with the second communication device, each of the plurality of transport nodes holds a routing information table for storing information about correlations between network addresses notified from the logical path control server and logical path identifiers of the logical paths between the plurality of transport nodes, upon receiving the logical path control data, the logical path control server selects a logical path of which a given transport node is the first transport node which sent the logical path control data from the preset logical paths between the plurality of transport nodes based on the logical path database, the logical path control server registers a logical path identifier of the selected logical path and a network address included in the logical path control data in association with a routing information table of a transport node, which is a source transport node of the selected logical path, the source transport node of the selected logical path notifies the network address included in the logical path control data and registered in the routing information table to the second communication device connected with the source transport node, and the logical path control server sends a response data corresponding to the logical path control data, via the first transport node which transferred the logical path control data, to the first communication device which sent the logical path control data.

15. The logical path control server according to claim 14, wherein the routing information table stores information about the logical paths between the plurality of transport nodes and logical path information of the communication network received from the logical path control server, and the logical path control server registers the logical path information of the communication network included in the logical path control data in association in a routing information table of a transport node which is a source transport node of the selected logical path.

* * * * *